(12) United States Patent
Fukushima et al.

(10) Patent No.: US 12,458,298 B2
(45) Date of Patent: Nov. 4, 2025

(54) INFORMATION PROCESSING APPARATUS, INFORMATION PROCESSING METHOD, INFORMATION PROCESSING SYSTEM, AND PROGRAM

(71) Applicant: CANON KABUSHIKI KAISHA, Tokyo (JP)

(72) Inventors: Satoru Fukushima, Kanagawa (JP); Yoshihiro Hirata, Tokyo (JP); Ritsuya Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 17/680,064

(22) Filed: Feb. 24, 2022

(65) Prior Publication Data

US 2022/0175325 A1    Jun. 9, 2022

Related U.S. Application Data

(63) Continuation of application No. PCT/JP2020/030133, filed on Aug. 6, 2020.

(30) Foreign Application Priority Data

Aug. 30, 2019  (JP) .................................. 2019-158973
Aug. 5, 2020   (JP) .................................. 2020-132816

(51) Int. Cl.
*A61B 5/00*  (2006.01)
*A61B 3/12*  (2006.01)
(Continued)

(52) U.S. Cl.
CPC .............. *A61B 5/7275* (2013.01); *A61B 3/12* (2013.01); *A61B 5/021* (2013.01); *A61B 5/4872* (2013.01);
(Continued)

(58) Field of Classification Search
CPC ......... G06T 2207/30041; G06T 7/0012; G06T 2207/20036; G06T 2207/10101;
(Continued)

(56) References Cited

U.S. PATENT DOCUMENTS

2019/0180441 A1*  6/2019  Peng ..................... G06T 7/0016

FOREIGN PATENT DOCUMENTS

CN         103493054 A     1/2014
CN         107680683 A     2/2018
(Continued)

OTHER PUBLICATIONS

Bizopoulos, P., et al., "Deep Learning in Cardiology", IEEE Reviews in Biomedical Engineering, Dec. 9, 2019, pp. 168-193, vol. 12.
(Continued)

*Primary Examiner* — Brandi N Thomas
(74) *Attorney, Agent, or Firm* — Canon U.S.A., Inc., IP Division

(57) ABSTRACT

An information processing apparatus disclosed in the present specification includes: estimation means for estimating a subject's risk of developing a disease using a learned model that has learned a relationship between a feature obtained from a fundus image and a risk of developing the disease, which is evaluated from the feature; and correction means for correcting the estimated risk of developing the disease based on the subject's biological information.

15 Claims, 13 Drawing Sheets

(51) Int. Cl.
 *A61B 5/021* (2006.01)
 *G06F 3/14* (2006.01)
 *G06T 7/00* (2017.01)
 *G06V 40/18* (2022.01)
 *G16H 10/60* (2018.01)
 *G16H 50/30* (2018.01)

(52) U.S. Cl.
 CPC ............... *A61B 5/742* (2013.01); *G06F 3/14* (2013.01); *G06T 7/0012* (2013.01); *G06V 40/193* (2022.01); *G16H 10/60* (2018.01); *G16H 50/30* (2018.01); *G06T 2207/20036* (2013.01); *G06T 2207/30041* (2013.01)

(58) Field of Classification Search
 CPC ...... G06V 10/82; A61B 2576/00; A61B 3/12; A61B 5/02007; A61B 5/7445; G16H 10/60
 See application file for complete search history.

(56) References Cited

FOREIGN PATENT DOCUMENTS

| EP | 3082602 A1 | 10/2016 |
|---|---|---|
| EP | 3485411 A2 | 5/2019 |
| JP | 2005063456 A | 3/2005 |
| JP | 2017503561 A | 2/2017 |
| JP | 2019082881 A | 5/2019 |
| JP | 2019118814 A | 7/2019 |
| KR | 20150031173 A | 3/2015 |
| WO | 2017094267 A1 | 6/2017 |
| WO | 2018035473 A2 | 2/2018 |
| WO | 2019/075410 A1 | 4/2019 |
| WO | 2019/125026 A1 | 6/2019 |
| WO | 2019150813 A1 | 8/2019 |

OTHER PUBLICATIONS

Ting, D.S.W., et al., "Deep learning in ophthalmology: The technical and clinical considerations", Progress in Retinal and Eye Research, Apr. 18, 2019, vol. 72.
Wikipedia, "Generative adversarial network", Aug. 27, 2019.
Wikipedia, "Autoencoder", Jun. 11, 2019.
Wang Ruonan et al., Progress of imaging diagnosis in diabetic retinopathy, 2017.

* cited by examiner

FIG. 4A
| Low risk | The risk of developing a disease is low. Please continue a healthy lifestyle. |
|---|---|
| Medium risk | The risk of developing a disease is medium. Please improve your lifestyle. Please have regular medical examinations. |
| High risk | The risk of developing a disease is high. Please consult a medical institution. |
FIG. 4B
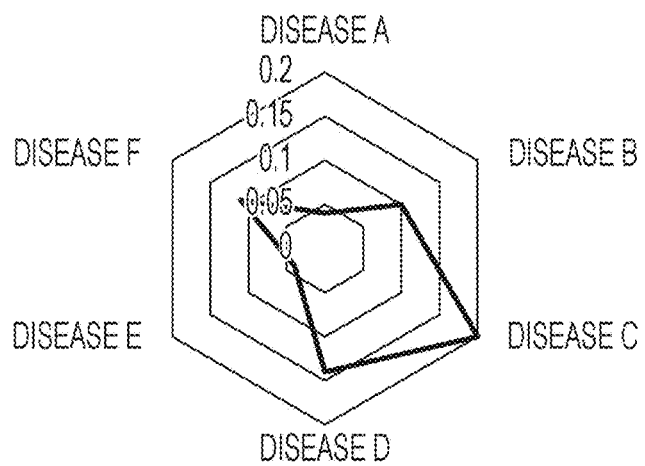
FIG. 4C
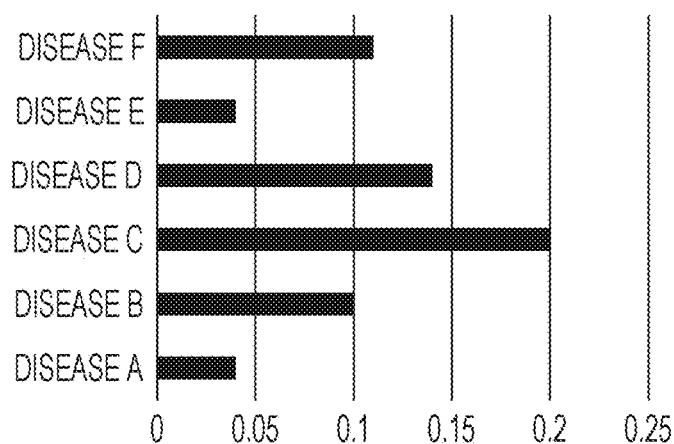

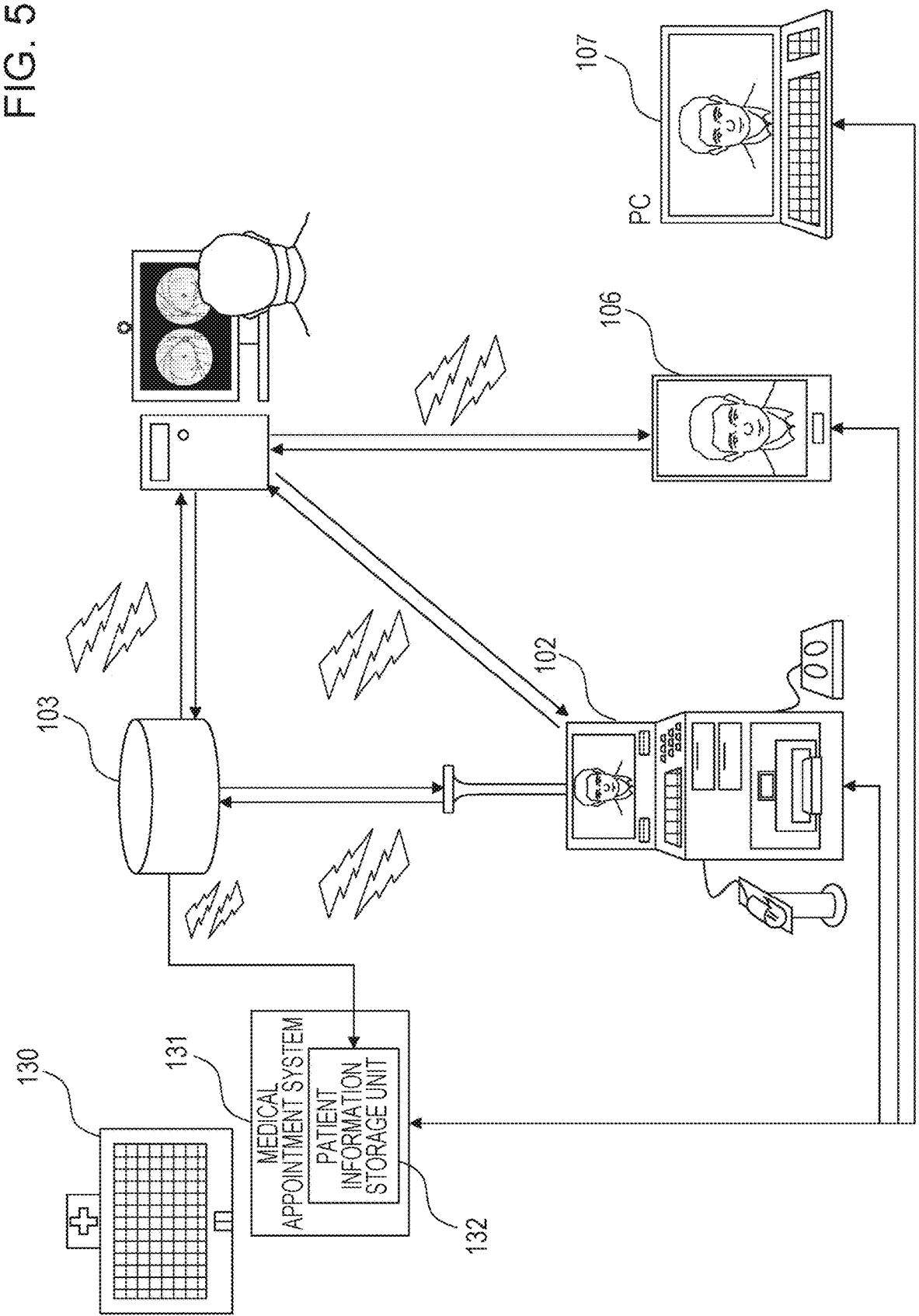

INFORMATION PROCESSING APPARATUS, INFORMATION PROCESSING METHOD, INFORMATION PROCESSING SYSTEM, AND PROGRAM

CROSS-REFERENCE TO RELATED APPLICATIONS

This application is a Continuation of International Patent Application No. PCT/JP2020/030133, filed Aug. 6, 2020, which claims the benefit of Japanese Patent Application No. 2019-158973, filed Aug. 30, 2019, and Japanese Patent Application No. 2020-132816, filed Aug. 5, 2020, all of which are hereby incorporated by reference herein in their entirety.

TECHNICAL FIELD

The disclosure of the present specification is related to an information processing apparatus, an information processing method, an information processing system, and a program.

BACKGROUND ART

For screening and diagnosis of diseases, various types of diagnostic imaging equipment using general X-ray imaging, X-ray computed tomography (CT), nuclear magnetic resonance (NMR) imaging, ultrasonography, positron emission tomography (PET), or single photon emission computed tomography (SPECT) are used to capture images of various parts of the body.

In particular, eyes are the only parts where blood vessels are observable directly from the outside. Eye diseases such as diabetic retinopathy and age-related macular degeneration (AMD) have been diagnosed through eye examinations. Application of such technology is not limited to eye diseases, and it has been considered to apply such technology to early diagnosis of lifestyle diseases such as arteriosclerosis and diabetes mellitus (DM), and to screening of various diseases such as risk assessment of cerebral infarction and dementia. For example, technology for determining the risk of diseases using ophthalmic examination equipment is known. PTL 1 discloses that risk information indicating the risk of specific diseases is generated by analyzing examination data obtained from ophthalmic examination equipment.

CITATION LIST

Patent Literature

PTL 1 Japanese Patent Laid-Open No. 2017-386

SUMMARY OF INVENTION

However, it is difficult to achieve a sufficient risk determination accuracy by using only information obtained from biological images captured with diagnostic imaging equipment or ophthalmic examination equipment.

In view of the foregoing circumstances, it is an object of the disclosure of the present specification to improve the determination accuracy of disease risk determination.

It shall be noted that the disclosure of the present specification is not limited to the foregoing object, and achievement of operational effects that are derived from configurations illustrated in embodiments to implement the later-described invention and that may not be obtained by technology of the related art may be positioned as one of other objects of the disclosure of the present specification.

An information processing apparatus disclosed in the present specification includes:

obtaining means for obtaining a subject's fundus image;

estimation means for estimating the subject's risk of developing a disease (a) by inputting, as input data, a feature obtained from the obtained fundus image to a learned model that has learned a relationship between a feature obtained from a fundus image and a risk of developing the disease or (b) by inputting, as input data, the obtained fundus image to a learned model that has deep-learned a relationship between a fundus image and a risk of developing the disease; and correction means for correcting the estimated risk of developing the disease using a coefficient corresponding to the subject's biological information.

Further features of the present invention will become apparent from the following description of exemplary embodiments with reference to the attached drawings.

BRIEF DESCRIPTION OF DRAWINGS

FIG. 4A is a diagram illustrating a display example of a disease risk estimation result according to the first embodiment.

FIG. 4B is a diagram illustrating a display example of a disease risk estimation result according to the first embodiment.

FIG. 4C is a diagram illustrating a display example of a disease risk estimation result according to the first embodiment.

FIG. 5 is a diagram illustrating an example of the configuration of a medical appointment system according to a modification of the first embodiment.

DESCRIPTION OF EMBODIMENTS

An information processing apparatus according to the present embodiment is characterized in performing disease risk estimation based on a biological image (a medical image of an object under examination) captured with diagnostic imaging equipment or ophthalmic examination equipment and biological information obtained from other examinations.

Hereinafter, preferred embodiments of an information processing apparatus disclosed in the present specification will be described in detail in accordance with the accompanying drawings. Note that elements described in these embodiments are only exemplary, and the technical scope of the information processing apparatus disclosed in the present specification is determined by the claims and is not limited by the following individual embodiments. In addition, the disclosure of the present specification is not limited to the following embodiments, and various modifications (including organic combinations of the embodiments) are possible based on the gist of the disclosure of the present specification and are not to be excluded from the scope of the disclosure of the present specification. That is, configurations obtained by combining the later-described embodiments and their modifications are all included in the embodiments disclosed in the present specification.

In the following embodiments, although the case where a fundus camera is used as imaging equipment for capturing a biological image used for disease risk estimation will be described as a representative example, this is not the only possible case, and other diagnostic imaging equipment or ophthalmic examination equipment is also suitably applicable. For example, other ophthalmic examination equipment such as optical coherence tomography equipment (OCT scanner) capable of capturing images of the fundus and anterior segment may be used in accordance with diseases for which risk estimation is performed. In addition, diagnostic imaging equipment used for screening and diagnosis of diseases, such as general X-ray imaging, X-ray computed tomography (CT), nuclear magnetic resonance (NMR) imaging, ultrasonography, positron emission tomography (PET), or single photon emission computed tomography (SPECT), may also be used.

First Embodiment

Figure 1:
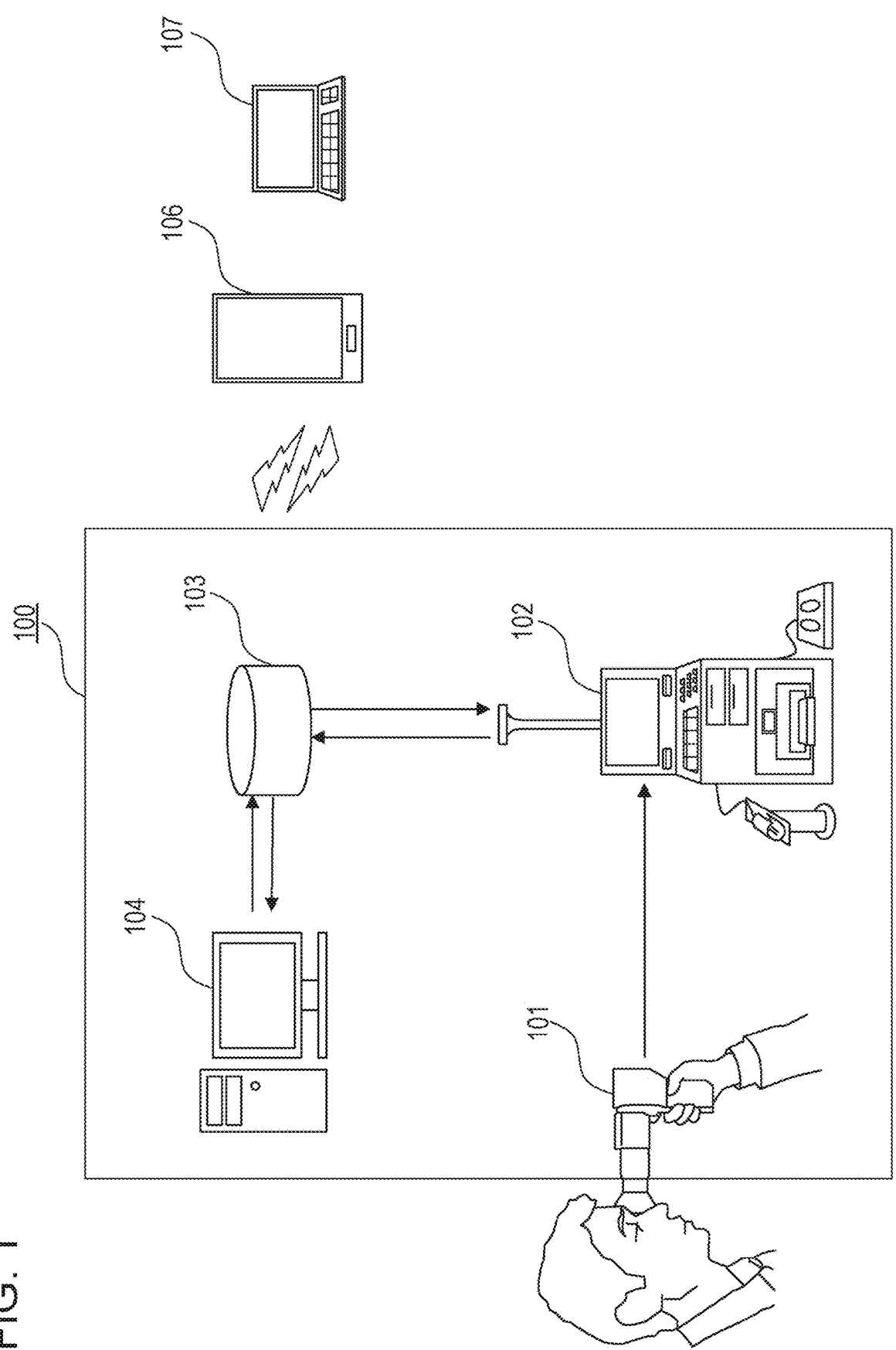
FIG. 1 is a diagram illustrating an example of the overall configuration of an examination system according to a first embodiment.

FIG. 1 is a diagram illustrating the overall configuration of an information processing system 100 including an information processing apparatus according to the present embodiment.

The information processing system 100 includes a fundus camera 101, a biological information examination apparatus 102, a cloud server 103, and an information processing apparatus 104.

The fundus camera 101 captures a fundus image, which is a biological image used for disease risk estimation.

To capture an image with the fundus camera 101, for example, near infrared light may be used. In general, in the case of capturing an image, there are factors that may reduce the quality of a still image, such as the subject's eye position, body movement, blinking, and foreign matter mixed in the image. Therefore, in the case where a captured image is inappropriate for calculating an image feature, it is necessary to capture an image again. However, in the case of capturing an image with a flash of visible light used in a fundus camera of the related art, miosis occurs, and it takes some time to capture an image again. Therefore, miosis may be prevented by using near infrared light, and continuous and repetitive imaging may be possible. In addition, a moving image may be easily captured without causing miosis by using near infrared light.

Alternatively, weak visible light may be used for capturing an image with the fundus camera 101. As described above, in general, in the case of capturing an image, there are factors that may reduce the quality of a still image, such as the subject's eye position, body movement, blinking, and foreign matter mixed in the image. In the case where a captured image is inappropriate for calculating an image feature, it is necessary to capture an image again. However, in the case of capturing an image with a flash of visible light used in a fundus camera of the related art, miosis occurs, and it takes some time to capture an image again. Therefore, miosis may be prevented by using weak visible light, and continuous and repetitive imaging may be possible. In addition, a moving image may be captured without causing miosis by using weak visible light.

Alternatively, in the case of capturing an image with the fundus camera 101, the same light source or a light source of the same illuminance as observation light used to search for the position of the anterior segment may be used.

It should be noted that the above is merely an example, and the above is not the only possible imaging method as long as a fundus image may be captured.

In the present embodiment, a fundus image captured with the fundus camera 101 is sent to the biological information examination apparatus 102 once. As the sending method, wired communication means such as USB or wireless communication means such as Wi-Fi (Wireless Fidelity) (registered trademark) or Bluetooth (registered trademark) is used. Note that the fundus image may be sent to the cloud server 103 without going through the biological information examination apparatus 102, or may be sent to the information processing apparatus 104.

Figure 8:
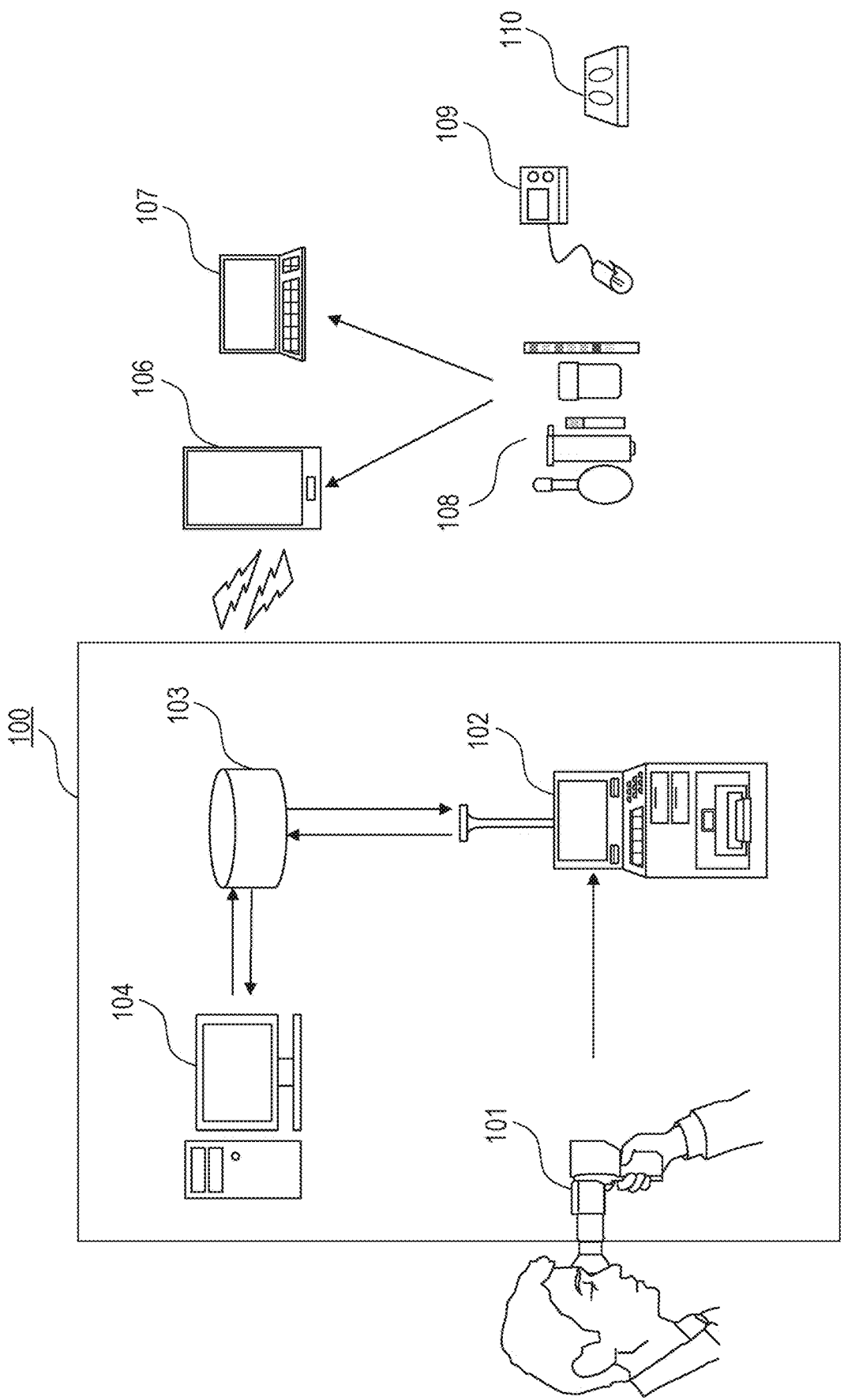
FIG. 8 is a diagram illustrating an example of the overall configuration of the examination system according to the first embodiment.

The biological information examination apparatus 102 obtains biological information used for disease risk estimation. The biological information examination apparatus 102 is capable of measuring biological information, such as the subject's height, body weight, body fat percentage, systolic blood pressure, diastolic blood pressure, irregular pulse wave, heart rate, or body temperature. Note that the biological information need not be obtained from examinations or measurements, and may be obtained from the user's entry of, for example, whether the user has a smoking habit, or the user's medical history. Furthermore, the biological information examination apparatus 102 may have, for example, a blood test function for measuring the blood glucose level, the number of red blood cells, hemoglobin, or uric acid from the subject's blood, or a urine test function for testing the subject's urine. In the case of tests using biological specimens, such as blood tests and urine tests, a biological information test kit 108 is provided to the subject by mail or the like, as illustrated in FIG. 8. The subject may save the result of the test done by himself/herself in the cloud server 103 via a personal computer 107 or a mobile information terminal 106. The subject may also save data not involving specimens, such as a blood pressure or a body weight measured with a sphygmomanometer 109 or a weight scale 110, in the cloud server 103 using the same or similar method. Note that the types of biological testing method and the flow of data sending and reception described above are only exemplary and are not limited to the above. It is only required that necessary biological information be sent to the information processing apparatus 104.

The cloud server 103 stores and manages data such as images captured with the fundus camera 101 and biological information obtained by the biological information examination apparatus 102.

Figure 2:
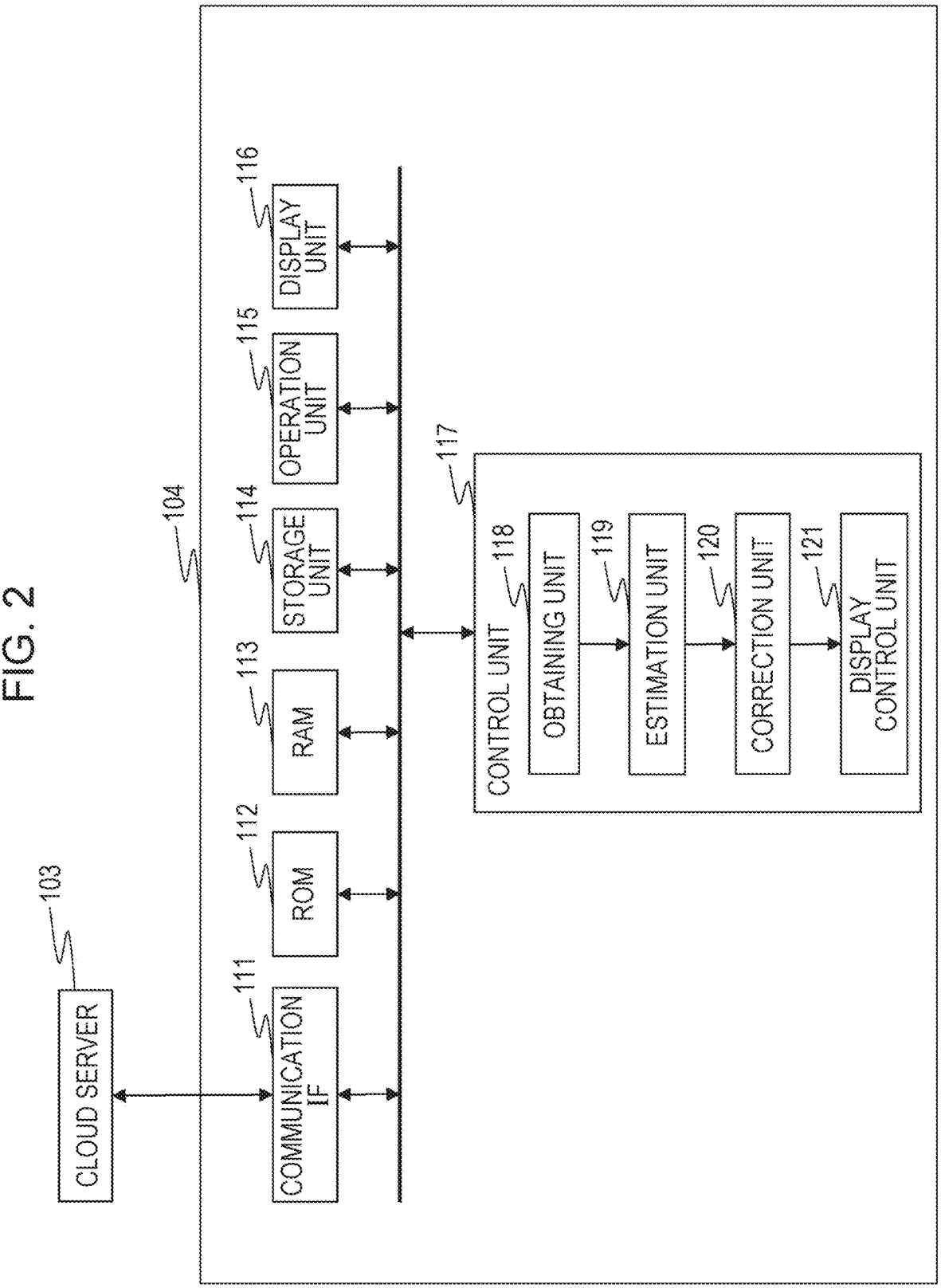
FIG. 2 is a block diagram illustrating the functional configuration of an information processing apparatus according to the first embodiment.

As illustrated in FIG. 2, the information processing apparatus 104 includes, as functional configurations, a communication IF (Interface) 111, ROM (Read Only Memory) 112, RAM (Random Access Memory) 113, a storage unit 114, an operation unit 115, a display unit 116, and a control unit 117.

The communication IF 111 is realized by a LAN card or the like, and is in charge of communication between an external apparatus (such as the cloud server 103) and the information processing apparatus 104. The ROM 112 is realized by non-volatile memory or the like, and stores various programs and the like. The RAM 113 is realized by volatile memory or the like, and temporarily stores various types of information. The storage unit 114 is an example of a computer-readable storage medium, is realized by a large-capacity information storage device represented by a hard disk drive (HDD) or a solid state drive (SSD), and stores various types of information. The operation unit 115 is realized by a keyboard, mouse, and the like, and enters instructions from the user to the apparatus. The display unit 116 is realized by a display or the like, and displays various types of information for the user. The control unit 117 is realized by a CPU (Central Processing Unit), GPU (Graphical Processing Unit), or the like, and performs integrated control of various processes in the information processing apparatus 104.

The control unit 117 includes, as its functional configurations, an obtaining unit 118, an estimation unit 119, a correction unit 120, and a display control unit 121.

The obtaining unit 118 reads and obtains, from the cloud server 103, data such as the subject's fundus image captured with the fundus camera 101 and the subject's biological information obtained by the biological information examination apparatus 102. Note that the data need not be obtained from the cloud server 103, and data directly sent from the fundus camera 101 or the biological information examination apparatus 102 may be obtained.

The estimation unit 119 estimates the subject's risk of disease from the subject's fundus image obtained by the obtaining unit 118 (executes risk estimation processing). In the present embodiment, the risk of disease indicates the probability of developing a disease within a certain period. The probability of developing a disease may be expressed quantitatively, such as in percentage, or qualitatively, such as high or low risk.

The correction unit 120 corrects the disease risk estimation estimated by the estimation unit 119, and calculates the final disease risk. More specifically, the correction unit 120 corrects the disease risk estimation result estimated by a learned model by using a weight coefficient of the probability of developing each disease, which is set in advance for each item of biological information obtained by the biological information examination apparatus 102. That is, the correction unit 120 corresponds to an example of correction means for correcting the risk of developing a disease using a certain weight coefficient determined for each item of biological information.

The display control unit 121 displays the final disease risk estimation result corrected by the correction unit 120 on the display unit 116.

Figure 3:
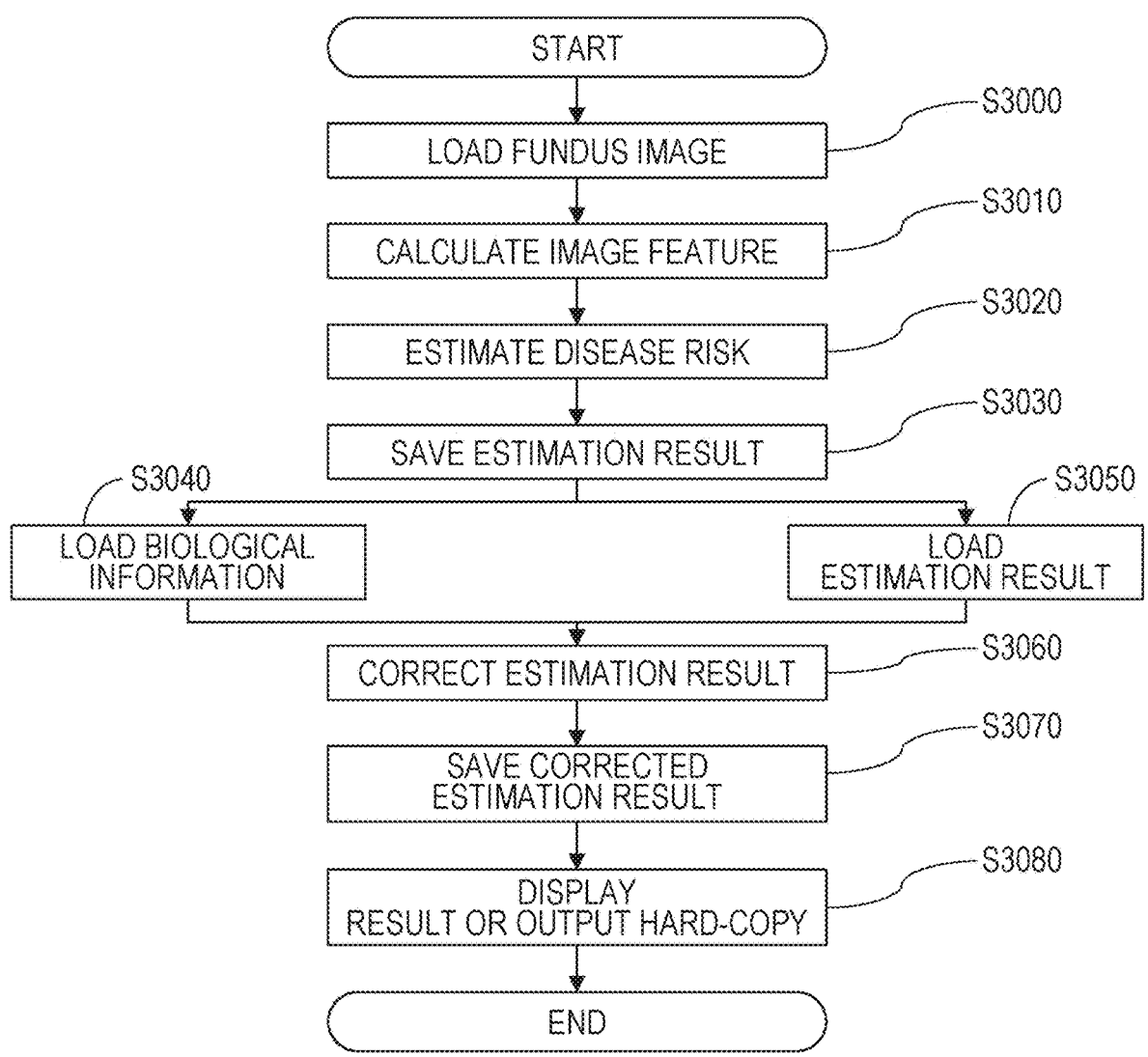
FIG. 3 is a flowchart illustrating an example of a procedure of the information processing apparatus according to the first embodiment.

Next, a procedure of the information processing apparatus 104 according to the present embodiment for performing disease risk estimation will be described using the flowchart in FIG. 3.

(S3000) (Loading of Fundus Image)

In S3000, the obtaining unit 118 loads and obtains a fundus image that is captured by the fundus camera 101 and stored in the cloud server 103. Alternatively, the obtaining unit 118 obtains a fundus image directly sent from the fundus camera 101.

(S3010) (Calculation of Image Feature)

In S3010, the estimation unit 119 detects a feature for estimating a disease risk from the fundus image obtained from the cloud server 103.

Alternatively, the estimation unit 119 may obtain, from the cloud server 103, a moving image captured with the fundus camera 101, and detect a desired image feature from the moving image. In general, in the case of capturing an image, there are factors that may reduce the quality of a still image, such as the subject's eye position, body movement, blinking, and foreign matter mixed in the image. Therefore, by calculating an image feature from a portion of the moving image that has no image quality problem and that is suitable for calculating an image feature, a disease risk may be appropriately estimated. To select an optimal portion of the moving image, the image brightness, contrast, and sharpness, and matching with a pre-registered pattern may be appropriately used.

A to-be-detected feature includes, for example, morphological features of a defective part, such as a blood vessel diameter, curvature, angle, and bifurcation, and color information. Alternatively, a to-be-detected feature may be, for example, an abnormal shape of a portion other than blood vessels due to hemorrhage, vitiligo, or the like, image contrast, and color information. Note that these features are not the only possible features used for risk estimation, and various features may be used.

(S3020) (Estimation of Disease Risk)

In S3020, the estimation unit 119 estimates a disease risk by inputting the feature detected in S3010 to a learned model. That is, the estimation unit 119 corresponds to an example of estimation means for estimating a subject's risk of developing a disease using a learned model that has learned a relationship between a feature obtained from a fundus image and the risk of developing the disease, which is evaluated from the feature. More specifically, the estimation unit 119 corresponds to an example of estimation means for estimating a probability that a subject will develop a disease by inputting a feature obtained from the subject's fundus image to a learned model.

Here, the learned model indicates a machine learning model that follows a machine learning algorithm, such as support vector machines, and that has performed learning in advance using appropriate learning data. Note that the learned model is not a model that performs no further learning, but is a model that may perform additional learning.

Learning data includes a group of one or more pairs of input data and output data (correct answer data). A learned model according to the present embodiment follows an arbitrary learning algorithm and learns, as learning data, output data (data regarding disease risks) for input data (data regarding features detected from biological images such as fundus images). Specifically, for example, a correlation between an abnormal shape of a portion other than blood vessels due to hemorrhage, vitiligo, or the like detected from a fundus image and a probability of developing diabetic retinopathy is learned. Alternatively, a correlation between a feature regarding vascular morphology indicating, for example, an artery diameter, vein diameter, ratio of the artery diameter and the vein diameter, vascular bifurcation angle, asymmetry of the bifurcation, arterial vein stenosis, or vascular twisting, and the risk of developing cardiovascular disease, stroke, or the like, which is evaluated from the feature, is learned. Note that the risk of developing a disease, as mentioned above, may be output as a percentage, or may be identified and output in one of multiple qualitative classes, such as high risk, low risk, and so forth. Correlations between input data and output data to be learned are not limited to the above combinations, and various correlations related to disease risk estimation may be learned.

In addition, the learned model may repetitively execute learning based on a data set including input data and output data.

In the present embodiment, the learned model for performing disease risk estimation may be generated by the information processing apparatus 104, or may be a model generated by an information processing apparatus different from the information processing apparatus 104.

In the case where the information processing apparatus 104 also generates a learned model for performing disease risk estimation, the information processing apparatus 104 further includes a generation unit (not illustrated).

As described above, the generation unit follows an arbitrary learning algorithm, learns, as training data, output data for input data, and generates a learned model. Specific algorithms for machine learning include the nearest neighbor algorithm, naive Bayes, decision trees, support-vector machines, and the like. In addition, deep learning is also available where neural networks are used to generate a feature to learn and a coupling weight coefficient by itself. In the case of performing deep learning using neural networks, a learned model is obtained by learning a set of a fundus image and the risk of developing a disease, which is evaluated from the fundus image. For example, because a blood vessel called a retinal arteriole has a higher risk of developing hypertension in a person whose retinal arteriole is thinner than in a person whose retinal arteriole is wider, a high risk is combined as learning data for a fundus image evaluated as having a thinner retinal arteriole, as described above.

That is, the estimation unit 119 corresponds to an example of estimation means for estimating (executing risk estimation processing) the subject's risk of developing a disease by inputting the subject's fundus image obtained by the obtaining means to a learned model that has deep-learned a relationship between a fundus image and a risk of developing the disease, which is evaluated from the fundus image.

Note that the relationship between input data and output data to be learned is not limited to the above combination, and various correlations related to disease risk estimation may be learned. Among the above-mentioned algorithms, usable ones are appropriately applicable to the present embodiment.

Note that a plurality of learned models may be generated according to diseases whose risk is to be estimated, or one learned model may be generated so as to be able to estimate the risk of multiple diseases.

That is, the estimation unit 119 corresponds to an example of estimation means for estimating the subject's risk of developing a first disease and a second disease using a learned model that has learned a relationship between a feature obtained from a fundus image and a risk of developing the first disease, which is evaluated from the feature, and a relationship between a feature obtained from a fundus image and a risk of developing the second disease, which is evaluated from the feature.

Alternatively, the estimation unit 119 corresponds to an example of estimation means for estimating a subject's risk of developing a first disease and a second disease using a first learned model that has learned a relationship between a feature obtained from a fundus image and a risk of developing the first disease, which is evaluated from the feature, and a second learned model that has learned a relationship between a feature obtained from a fundus image and a risk of developing the second disease, which is evaluated from the feature.

(S3030) (Saving of Estimation Result)

In S3030, the information processing apparatus 104 saves the estimated disease risk in the storage unit 114. Alternatively, the information processing apparatus 104 transfers the estimated disease risk to the cloud server 103 via the communication IF 111 and saves it in the cloud server 103. Note that the information processing apparatus 104 may save the estimated disease risk in both the storage unit 114 and the cloud server 104.

(S3040) (Loading of Biological Information)

In S3040, the information processing apparatus 104 loads biological information that is obtained from the biological information examination apparatus 102 and stored in the cloud server 103. Alternatively, the information processing apparatus 104 obtains biological information directly sent from the biological information examination apparatus 102.

(S3050) (Loading of Estimation Result)

In S3050, the obtaining unit 118 loads the disease risk estimation result, which is stored in the storage unit 114 or the cloud server 103.

(S3060) (Correction of Estimation Result)

In S3060, the correction unit 120 corrects the disease risk estimation result estimated by the estimation unit 119, and calculates the final disease risk. More specifically, the correction unit 120 corrects the probability of developing each disease using a weight coefficient of the probability of developing each disease, which is set in advance for each of items of biological information measured and examined using the biological information examination apparatus 102. For example, because the probability of developing a disease, which is developed according to each subject's blood pressure or body-mass index (BMI) obtained from height and body weight, is different, a probability calculated on the basis of a feature obtained from a fundus image is corrected on the basis of biological information. As a correction amount, a value calculated from features obtained from fundus images of persons with a disease and from fundus images of healthy persons, who serve as subjects, and the results of evaluating their biological information is used.

Thereafter, the corrected probability is calculated as the final risk estimation result. Note that multiple thresholds may be set for the probability of developing a disease, the probability may be classified into one of categories of multiple risk levels using the thresholds, and the classified category may serve as the final risk estimation result. For example, the probability of developing a disease is divided into three levels, "0 to 33%, 34% to 66%, and 67% to 100%", and they are respectively classified as the categories "low risk, medium risk, and high risk". Note that the above is not the only possible classification method, and the probability may be divided into two levels, or four or more levels. In addition, these threshold values are only exemplary and are not the only possible threshold values. That is, the above is not the only possible method of outputting the to-be-output estimation result, and it is only necessary that the subject recognize the degree of risk of developing a disease. Furthermore, although the corrected estimation result is classified into one of the categories above, output data may be classified beforehand into one of classes such as "low risk, medium risk, and high risk" and learned at the time a learned model is trained, and, when a disease risk is estimated in S3020, the estimation result may be output in a classified form.

(S3070) (Saving of Corrected Estimation Result)

In S3070, the information processing apparatus 104 saves the corrected disease risk in the storage unit 114. Alternatively, the information processing apparatus 104 transfers the estimated disease risk to the cloud server 103 via the communication IF 111 and saves it in the cloud server 103. Note that the information processing apparatus 104 may save the estimated disease risk in both the storage unit 114 and the cloud server 104.

(S3080) (Display Result or Output Hard-Copy)

In S3080, the display control unit 121 displays the estimated final disease risk on the display unit 116. Alternatively, the estimated final disease risk may be sent to a separate printer to output a hard-copy.

Figure 4D:
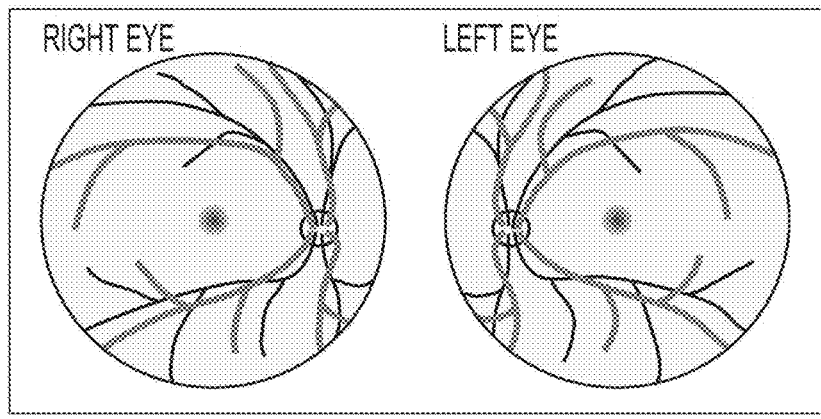
FIG. 4D is a diagram illustrating a display example of a disease risk estimation result according to the first embodiment.

FIGS. 4A to 4F illustrate display examples of the disease risk estimation result. FIG. 4A illustrates the case where the disease risk estimation result, which is calculated as a disease risk level, is classified into one of three levels, high risk, medium risk, and low risk, and is displayed. That is, the display control means unit 121 classifies the corrected risk of developing a disease into one of multiple classes and displays the classified risk on a display unit. Furthermore, a description of what each category represents is displayed. For example, if the estimated category is "low risk", the description "The risk of developing a disease is low. Please continue a healthy lifestyle." is displayed. Note that the above description is only exemplary and is not the only possible description. Furthermore, the categories need not be accompanied by descriptions, and a tab may be provided for giving a supplementary description only when the subject wishes to know more about the disease, such as when the subject is estimated to be at a high risk. Alternatively, the categories may be accompanied by simple descriptions, and tabs may be provided for giving supplementary descriptions when the subject wishes to know more details.

In addition, the disease risk estimation result may be displayed graphically. As illustrated in FIG. 4B, the result of estimating the risk of multiple diseases may be indicated using a radar chart. Alternatively, as illustrated in FIG. 4C, the result of estimating the risk of multiple diseases may be indicated using a bar graph. Note that the above is only exemplary, and the form is not particularly limited as long as the result of estimating the risk of one or more diseases is visually represented in two dimensions.

Figure 4E:
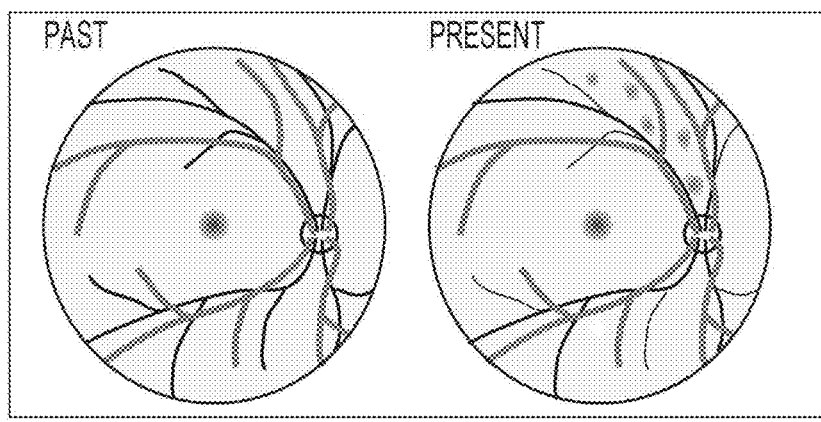
FIG. 4E is a diagram illustrating a display example of a disease risk estimation result according to the first embodiment.
Figure 4F:
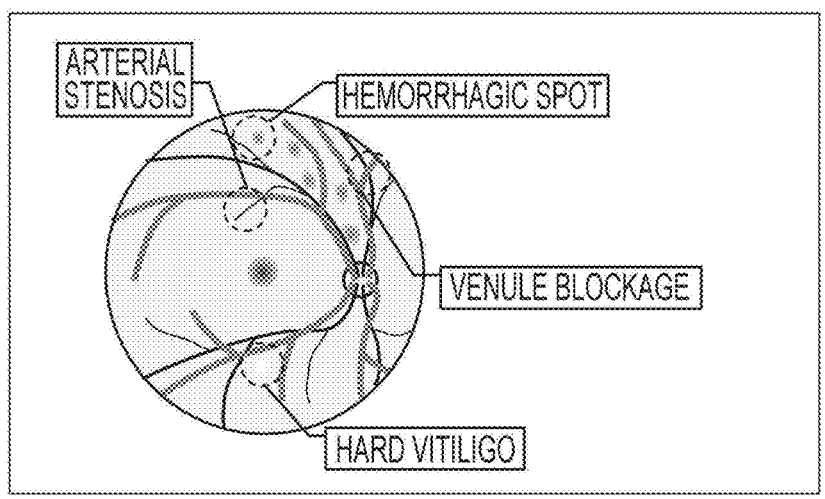
FIG. 4F is a diagram illustrating a display example of a disease risk estimation result according to the first embodiment.

In addition, FIGS. 4D to 4F illustrate that fundus images captured with the fundus camera 101 are displayed. By displaying these fundus images in parallel with the result in FIGS. 4A to 4C, the disease risk estimation result and the fundus images may be viewed at the same time. That is, the display control unit 121 may display the corrected result of estimating the risk of developing one or more diseases and the subject's fundus images in parallel.

Specifically, FIG. 4D illustrates that images of the left and right eyes are displayed in parallel. In addition, FIG. 4E illustrates that two images captured at different times (a current image and a past image) are displayed in parallel. Furthermore, FIG. 4F illustrates an example where major image portions related to risk estimation are indicated with descriptions. That is, parts highly correlated with diseases in a fundus image are displayed with emphasis.

Figure 7:
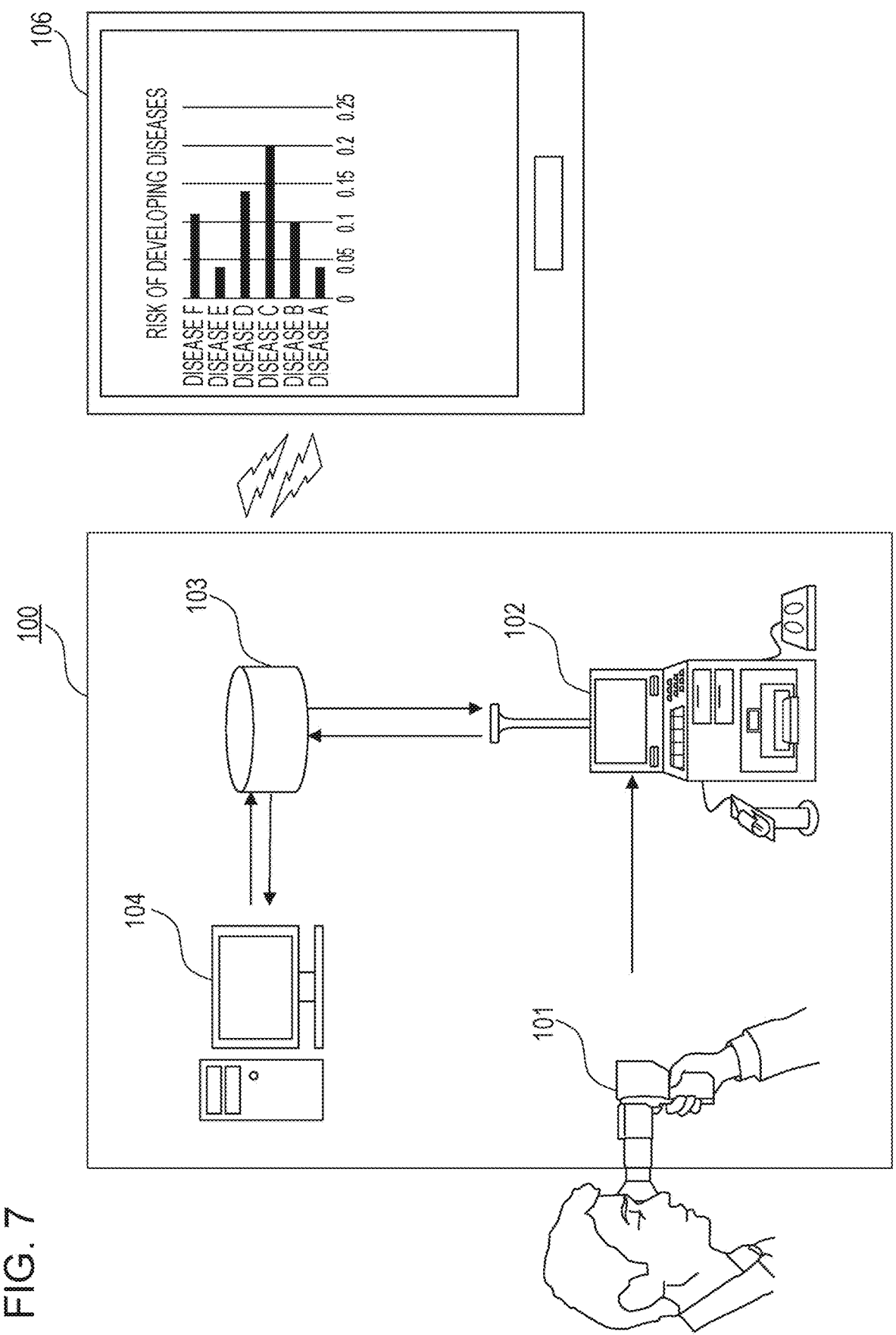
FIG. 7 is a diagram illustrating an example of the overall configuration of the examination system according to the first embodiment.

Note that these are not the only possible display methods, and various methods of displaying the risk estimation result, or display using not only captured images, but also biological information, past information thereof, progress, etc. may be performed. Furthermore, the estimation result may be displayed not only on the display unit 116 of the information processing apparatus 104, but also on a display unit of the biological information examination apparatus 102. Alternatively, as illustrated in FIG. 7, application software dedicated to examination systems is installed in the mobile information terminal 106. This may allow the received disease risk estimation result and other information regarding other examination systems to be displayed on the mobile information terminal 106 via the application software. That is, the information processing apparatus 104 is not the only possible apparatus for displaying the estimation result.

In addition, the disease risk estimation result may not be only displayed on a display unit, but also be sent to a separate printer to output a hard-copy.

Accordingly, the processing of the information processing apparatus 104 is implemented.

According to the above, in the case of estimating a subject's disease risk, the estimation result estimated on the basis of a feature obtained from a fundus image is corrected using a weight coefficient of the probability of developing each disease, which is set in advance for each item of biological information, thereby improving the accuracy of the estimation result. In addition, because it involves no specialization to conduct disease risk estimation, disease risk estimation may be easily performed regardless of a user. Furthermore, by classifying a disease risk into one of multiple levels and displaying the estimation result in a display form allowing the subject to easily recognize, the subject may intuitively recognize the disease risk. In addition, by displaying a biological image such as a fundus image serving as an examination target in parallel with the estimation result, the position of the disease may be more easily recognizable.

(First Modification)

In the first embodiment, the risk of diseases is estimated, and is output by being displayed or printed. In this modification, the estimation result is sent to a medical institution or the like so that the subject will be able to receive additional tests, visit an appropriate medical institution and clinical department, and receive consultations such as lifestyle-related guidance.

FIG. 5 illustrates the configuration of a system for cooperating with medical institutions 130 and giving advice to the subject.

In the examination system of the present embodiment, from among the pre-registered medical institutions 130, a recommended medical institution 130 and clinical department are output, along with the risk estimation result, in accordance with the type of disease and the risk estimation result. The subject may check, for example, the above-mentioned output result on the display unit of the biological information examination apparatus 102, a hard copy, the mobile information terminal 106, or the personal computer 107.

The cloud server 103 saves the medical institutions 102 130 and relevant clinical departments according to the type of disease and the degree of risk of the disease. By reading out these items of information from the cloud server 103 according to the risk estimation result, the medical institution 130 and clinical department may be sent to the biological information examination apparatus 102, the mobile information terminal 106, and/or the personal computer 107 to be presented to the subject.

Furthermore, an appointment with the medical institution 130 may be made on the biological information examination apparatus 102, the mobile information terminal 106, and/or the personal computer 107. Appointment application software for making an appointment with a medical institution is installed in the biological information examination apparatus 102.

In addition, in order to make an appointment on the mobile information terminal 106 or the personal computer 107, appointment application software is downloaded and installed.

The appointment application software communicates with a medical appointment system 132 131 of the medical institution 130 and asks about the subject's ID and desired appointment date and time. If an appointment is possible after collating with the latest appointment situation saved in the medical appointment system, the medical appointment system 132 131 makes an appointment for the ID. In addition, if the appointment is completed, the captured images, biological information, and risk estimation result may be transferred to the medical institution 130 according to the consultation. Transfer of the captured images, biological information, and risk estimation result is selected on the appointment application software. With this operation, items of information such as the captured images, biological information, and risk estimation result are read out from the cloud server 103, transferred securely, and saved in a patient information storage unit 133 132 of the medical appointment system 132 131 of the medical institution 130.

In addition, in the examination system of the present embodiment, a physician's diagnosis and consultation may be provided on the system according to the disease risk obtained in the examination system. For example, if the result of risk estimation using an image of the fundus camera 101 indicates a high risk of fundus disease, the fundus image is transferred to a physician. On the basis of that, the subject may receive a face-to-face diagnosis and consultation with the physician via a video communication function (system capable of performing video communication) incorporated in the biological information examination apparatus 102 or the subject's mobile information terminal 106 or personal computer 107.

Similarly, if the risk of another disease is high, the subject may be able to receive additional tests, visit an appropriate medical institution and clinical department, and receive consultations such as lifestyle-related guidance.

Furthermore, in the examination system of the present embodiment, on the basis of the risk estimation result and the result obtained by the biological information system examination apparatus 102, the examination system may directly propose the subject to improve his/her lifestyle and take supplements and general medicine.

At this time, the contents of lifestyle improvement and recommended supplements and general medicine according to the type of disease and the degree of risk of the disease are saved in the cloud server 103.

By reading these items of information according to the risk estimation result from the cloud server 103, the above-mentioned proposal may be sent to the biological information examination apparatus 102, the mobile information terminal 106, and/or the personal computer 107 to be presented to the subject.

These are not the only possible services, and various services according to the above-mentioned risk estimation result may be provided.

Second Embodiment

In the first embodiment, the risk of disease estimated by inputting features obtained from a biological image to a learned model is corrected using a weight coefficient set in advance for each item of biological information obtained by a biological examination, thereby improving the accuracy of the disease risk estimation.

In contrast, in the present embodiment, the risk of disease is estimated using an image feature and a probability of developing disease, which are obtained from an image captured with the fundus camera 101, biological information obtained by the biological information examination apparatus 102, and a learned model that has learned the probabilities of developing disease.

The overall configuration of an information processing system according to the present embodiment is the same as the first embodiment. In addition, the fundus camera 101, the biological information examination apparatus 102, and the cloud server 103 used in the present embodiment are the same as the first embodiment.

Figure 6:
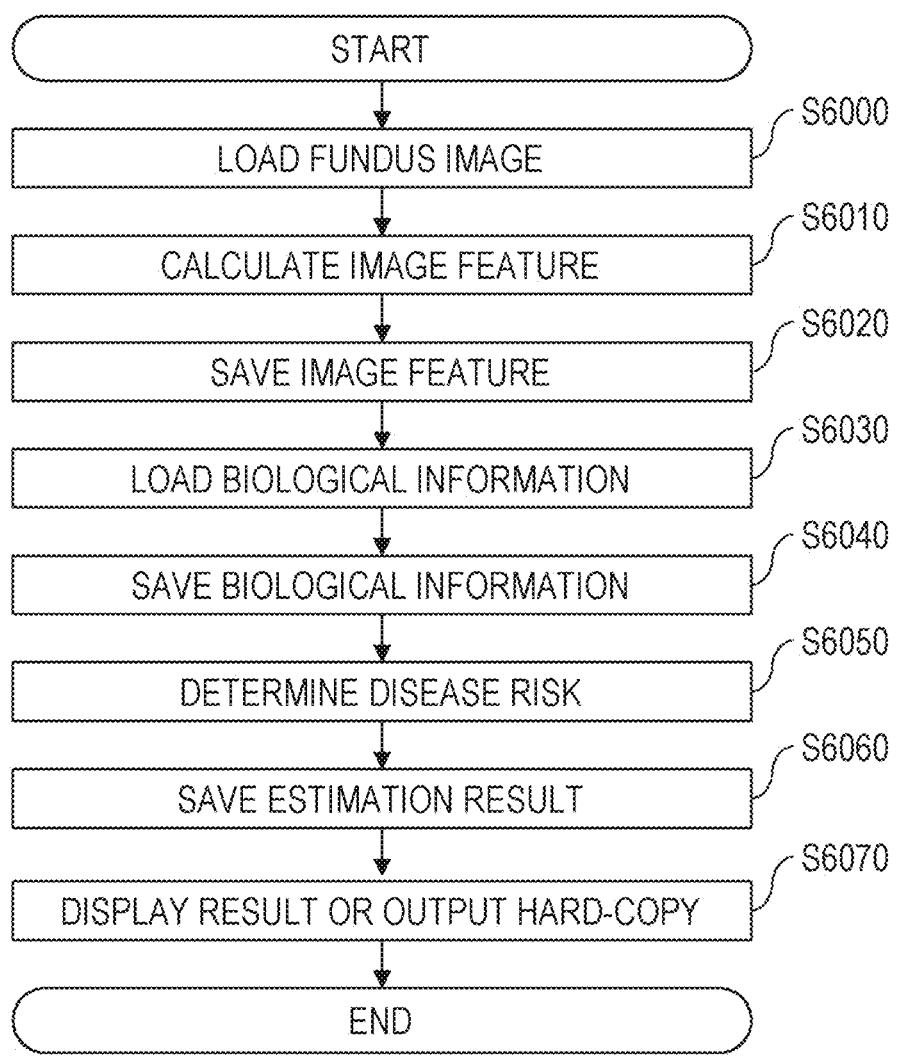
FIG. 6 is a flowchart of risk estimation according to a second embodiment.

Hereinafter, the processing steps of the present embodiment will be described using FIG. 6. Because S6000 to S6040 and S6070, S6010, and the like are the same as or similar to the first embodiment, descriptions thereof are omitted.

(S6050) (Estimation of Disease Risk)

In S6050, the obtaining unit 118 first obtains a feature obtained from the subject's fundus image and biological information measured and examined using the biological information examination apparatus 102, which are saved in the cloud server 103. The estimation unit 119 inputs the feature and biological information obtained by the obtaining unit 118 to a pre-generated learned model, thereby estimating the subject's risk of developing a disease (executes risk estimation processing).

Specifically, a feature obtained from a fundus image, such as an artery diameter, vein diameter, ratio of the artery diameter and the vein diameter, vascular bifurcation angle, asymmetry of the bifurcation, arterial vein stenosis, or vascular twisting, and biological information such as a blood pressure, BMI index, age, sex, medical history, or smoking habit serve as input data, and a correlation with the probability of developing a disease such as cardiovascular disease or cerebrovascular disease, evaluated from the feature and the biological information, is learned.

Note that correlations between input data and output data to be learned are not limited to the above combinations, and various correlations related to disease risk estimation may be learned.

In the present embodiment, the learned model for performing disease risk estimation may be generated by the information processing apparatus 104, or may be a model generated by an information processing apparatus different from the information processing apparatus 104.

(S6060) (Saving of Estimation Result)

In S6060, the information processing apparatus 104 saves the disease risk estimation result in the storage unit 114. Alternatively, the information processing apparatus 104 transfers the estimated disease risk to the cloud server 103 via the communication IF 111 and saves it in the cloud server 103. Note that the information processing apparatus 104 may save the estimated disease risk in both the storage unit 114 and the cloud server 104.

Accordingly, the processing of the information processing apparatus 104 is implemented.

According to the above, in the case of estimating a subject's disease risk, the accuracy of the disease risk estimation may be improved by using a learned model that has learned a correlation between a feature obtained from a fundus image and the probability of developing a disease, evaluated from biological information obtained by a biological test.

(Second Modification)

In the above-described various embodiments and modification, learning for tuning a learned model (learned model for estimation) used for estimation processing regarding a disease of an object under examination may be performed for each subject, and a learned model dedicated to that subject may be generated. For example, using tomographic images obtained in the subject's past examination, transfer learning of a general learned model for estimating a disease of an object under examination may be performed, and a learned model dedicated to that subject may be generated. By storing a learned model dedicated to a subject in association with the subject' ID in the storage unit 114 or an external apparatus such as a server, when examining the subject at present, the control unit 117 may identify and use the learned model dedicated to the subject on the basis of the subject's ID. Using a learned model dedicated to a subject, the estimation accuracy regarding a disease(s) of each subject may be improved.

(Third Modification)

In the above-described various embodiments and modifications, the control unit 117 may perform various types of image processing using images obtained by imaging. For example, for an image obtained by imaging, the control unit 117 may generate a high quality image whose quality is enhanced using a learned model for image quality enhancement (image quality enhancement model). Here, enhancement of the image quality includes noise reduction, conversion to colors and gradations for facilitating the observation of an imaging target, improvement of resolution and spatial resolution, and enlargement of image size with no or less resolution reduction.

As a machine learning model for image quality enhancement, for example, CNN or the like may be used. In addition, as learning data of an image quality enhancement model, various images such as anterior segment images and SLO images serve as input data, and high quality images that correspond to the input images, such as images processed for quality enhancement, serve as output data. Here, image quality enhancement processing includes aligning images captured multiple times at the same spatial position, and performing additive averaging processing of the aligned images. Note that the image quality enhancement processing is not limited to additive averaging processing, and may be, for example, processing using a smoothing filter, maximum posteriori probability estimation processing (MAP estimation processing), gradation conversion processing, or the like. In addition, as an image processed for quality enhancement, for example, an image that has undergone filter processing such as noise removal and edge enhancement, or an image whose contrast has been adjusted from a low-luminance image to a high-luminance image may be used. Furthermore, because it is only necessary that output data of learning data according to an image quality enhancement model be a high quality image, an image captured using an OCT scanner with higher performance than an OCT scanner used to capture tomographic images serving as input data, or an image captured with higher load settings may be used.

If machine learning is performed using an image that has not been appropriately processed for quality enhancement as output data of learning data, there is a possibility that an image obtained using a learned model that has done learning using this learning data may also become an image that has not been appropriately processed for quality enhancement. Therefore, by excluding a pair including such an image from training data, the likelihood of producing an inappropriate image using the learned model may be reduced.

By performing image quality enhancement processing using such an image quality enhancement model, the control unit 117 may obtain an image that has been accurately processed for quality enhancement at higher speed.

Note that an image quality enhancement model may be prepared for each type of various images serving as input data. For example, an image quality enhancement model for anterior segment images, an image quality enhancement model for SLO images, an image quality enhancement model for tomographic images, and an image quality enhancement model for OCTA frontal images may be prepared. In addition, for OCTA frontal images and En-Face images, an image quality enhancement model may be prepared for each depth range for generating an image. For example, a superficial-layer image quality enhancement model and a deep-layer image quality enhancement model may be prepared. Furthermore, an image quality enhancement model may be one that has learned images of each imaging part (such as the center of the macula or the center of the optic nerve head) or one that has done learning regardless of the imaging part.

At this time, for example, the image quality of a fundus OCTA frontal image may be enhanced using an image quality enhancement model obtained by learning fundus OCTA frontal images as learning data, and furthermore, the image quality of an anterior segment OCTA frontal image may be enhanced using an image quality enhancement model obtained by learning anterior segment OCTA frontal images as learning data. In addition, an image quality enhancement model may be one that has done learning regardless of the imaging part. Here, for example, a fundus OCTA frontal image and an anterior segment OCTA frontal image may be relatively similar in distribution of blood vessels, which are the imaging target. As described here, multiple types of medical images where the appearance of the imaging target is relatively similar may have features that are relatively similar. Thus, for example, it may be configured that, using an image quality enhancement model obtained by learning fundus OCTA frontal images as learning data, not only the image quality of a fundus OCTA frontal image is enhanced, but also the image quality of an anterior segment OCTA frontal image is enhanceable. In addition, for example, it may be configured that, using an image quality enhancement model obtained by learning anterior segment OCTA frontal images as learning data, not only the image quality of an anterior segment OCTA frontal image is enhanced, but also the image quality of a fundus OCTA frontal image is enhanceable. That is, it may be configured that, using an image quality enhancement model obtained by learning at least one type of frontal image of fundus OCTA frontal images or anterior segment OCTA frontal images as learning data, the image quality of at least one type of frontal image of a fundus OCTA frontal image or an anterior segment OCTA frontal image is enhanceable.

Here, the case where an OCT scanner capable of imaging the fundus is also capable of imaging the anterior segment is considered. At this time, for an En-Face image of OCTA, for example, a fundus OCTA frontal image may be applied in the fundus imaging mode, and an anterior segment OCTA frontal image may be applied in the anterior segment imaging mode. At this time, it may be configured that, in response to pressing of an image quality enhancement button, for example, in the fundus imaging mode, in a display region of the En-Face image of OCTA, one of a low quality fundus OCTA frontal image and a high quality fundus OCTA frontal image that is being displayed is changed to the other. In addition, it may be configured that, in response to pressing of the image quality enhancement button, for example, in the anterior segment imaging mode, in a display region of the En-Face image of OCTA, one of a low quality anterior segment OCTA frontal image and a high quality anterior segment OCTA frontal image that is being displayed is changed to the other.

If an OCT scanner capable of imaging the fundus is also capable of imaging the anterior segment, an anterior segment adapter may be configured to be wearable. Alternatively, instead of using an anterior segment adapter, the optical system of the OCT scanner may be configured to be movable for a distance of about the axial length of the eye under examination. At this time, it may be configured that the focus position of the OCT scanner is greatly changeable to the emmetropic side to the extent that an image is formed on the anterior segment.

In addition, for a tomographic image, for example, a fundus OCT tomographic image may be applied in the fundus imaging mode, and an anterior segment OCT tomographic image may be applied in the anterior segment imaging mode. In addition, image quality enhancement processing of a fundus OCTA frontal image and an anterior segment OCTA frontal image described above is also applicable as, for example, the image quality enhancement processing of a fundus OCT tomographic image and an anterior segment OCT tomographic image. At this time, it may be configured that, in response to pressing of the image quality enhancement button, for example, in the fundus imaging mode, in a display region of the tomographic image, one of a low quality fundus OCT tomographic image and a high quality fundus OCT tomographic image that is being displayed is changed to the other. In addition, it may be configured that, in response to pressing of the image quality enhancement button, for example, in the anterior segment imaging mode, in a display region of the tomographic image, one of a low quality anterior segment OCT tomographic image and a high quality anterior segment OCT tomographic image that is being displayed is changed to the other.

In addition, for a tomographic image, for example, a fundus OCTA tomographic image may be applied in the fundus imaging mode, and an anterior segment OCTA tomographic image may be applied in the anterior segment imaging mode. In addition, image quality enhancement processing of a fundus OCTA frontal image and an anterior segment OCTA frontal image described above is also applicable as, for example, image quality enhancement processing of a fundus OCTA tomographic image and an anterior segment OCTA tomographic image. At this time, for example, it may be configured that, in the fundus imaging mode, in a display region of the tomographic image, information indicating vascular regions (such as motion contrast data greater than or equal to a threshold) of a fundus OCTA tomographic image is displayed superimposed on a fundus OCT tomographic image at a corresponding position. In addition, for example, in the anterior segment imaging mode, in a display region of the tomographic image, information indicating vascular regions of an anterior segment OCTA tomographic image is displayed superimposed on an anterior segment OCT tomographic image at a corresponding position.

As described here, for example, in the case where the features of (the appearance of an imaging target in) multiple types of medical images are considered to be relatively similar, it may be configured to be able to enhance the quality of at least one type of medical image among multiple types of medical images using an image quality enhancement model obtained by learning at least one type of medical image among multiple types of medical images as learning data. Accordingly, for example, it may be configured that image quality enhancement of multiple types of medical images is executable using a common learned model (a common image quality enhancement model).

Note that a display screen in the fundus imaging mode and a display screen in the anterior segment imaging mode may have the same display layout or respective display layouts corresponding to their imaging modes. Various conditions such as imaging conditions and analysis conditions may be the same or different in the fundus imaging mode and the anterior segment imaging mode.

Here, images to be processed for quality enhancement may be, for example, multiple OCTA frontal images (corresponding to multiple depth ranges) (En-Face images of OCTA or En-Face images of motion contrast). In addition, an image to be processed for quality enhancement may be, for example, one OCTA frontal image corresponding to one depth range. In addition, an image to be processed for quality enhancement may be, instead of an OCTA frontal image, for example, a frontal image of luminance (En-Face image of luminance), or an OCT tomographic image which is a B scan image or a tomographic image (OCTA tomographic image) of motion contrast data. In addition, an image to be processed for quality enhancement may not only be an OCTA frontal image, but also various medical images such as a frontal image of luminance, an OCT tomographic image which is a B scan image, and a tomographic image (OCTA tomographic image) of motion contrast data. That is, it is only necessary that an image to be processed for quality enhancement be, for example, at least one of various medical images displayed on the display screen of the display unit 116. At this time, for example, because images may have different features depending on the type of image, a learned model for image quality enhancement corresponding to each type of image to be processed for quality enhancement may be used. For example, it may be configured that, when the image quality enhancement button is pressed as instructed by the examiner, not only an OCTA frontal image is processed for quality enhancement using a learned model for image quality enhancement corresponding to OCTA frontal images, but also an OCT tomographic image is processed for quality enhancement using a learned model for image quality enhancement corresponding to OCT tomographic images. In addition, for example, it may be configured that, when the image quality enhancement button is pressed as instructed by the examiner, not only the display is changed to a high quality OCTA frontal image generated using a learned model for image quality enhancement corresponding to OCTA frontal images, but also the display is changed to a high quality OCT tomographic image generated using a learned model for image quality enhancement corresponding to OCT tomographic images. At this time, it may be configured that a line indicating the position of the OCT tomographic image is displayed superimposed on the OCTA frontal image. In addition, it may be configured that the above-mentioned line is moveable on the OCTA frontal image in response to instructions from the examiner. In addition, it may be configured that, in the case where the display of the image quality enhancement button is active, after the above-mentioned line is moved, the display is changed to a high quality OCT tomographic image obtained by applying image quality enhancement processing to the OCT tomographic image corresponding to the position of the current line. In addition, it may be configured that, if an image quality enhancement button is displayed for each image to be processed for quality enhancement, each image is independently processable for quality enhancement.

In addition, information indicating vascular regions (such as motion contrast data greater than or equal to a threshold) of an OCTA tomographic image may be displayed superimposed on an OCT tomographic image which is a B scan image at a corresponding position. At this time, for example, when the image quality of the OCT tomographic image is enhanced, the image quality of the OCTA tomographic image at the corresponding position may be enhanced. Information indicating vascular regions of the quality-enhanced OCTA tomographic image may be displayed superimposed on the quality-enhanced OCT tomographic image. Note that information indicating vascular regions may be any information as long as colors and the like are distinguishable. In addition, it may be configured that the superimposed display and non-display of information indicating vascular regions are changeable according to instructions from the examiner. In addition, when a line indicating the position of the OCT tomographic image is moved on the OCTA frontal image, display of the OCT tomographic image may be updated in accordance with the position of the line. At this time, because the OCTA tomographic image at the corresponding position is also updated, the superimposed display of information indicating vascular regions obtained from the OCTA tomographic image may be updated. Accordingly, for example, while easily checking the positional relationship between vascular regions and a region of interest at an arbitrary position, the examiner may check the three-dimensional distribution and state of the vascular regions. In addition, image quality enhancement processing of an OCTA tomographic image may be performed by, instead of using a learned model for image quality enhancement, additive averaging processing of multiple OCTA tomographic images obtained at a corresponding position. In addition, an OCT tomographic image may be a pseudo-OCT tomographic image reconfigured as a cross section at an arbitrary position of OCT volume data. In addition, an OCTA tomographic image may be a pseudo-OCTA tomographic image reconfigured as a cross section at an arbitrary position of OCTA volume data. Note that it is only necessary that the arbitrary position be at least one arbitrary position, and it may be configured that the arbitrary position is changeable according to instructions from the examiner. At this time, it may be configured that multiple pseudo-tomographic images corresponding to multiple positions are reconfigured.

Note that one or more tomographic images (such as OCT tomographic images or OCTA tomographic images) may be displayed. In the case where multiple tomographic images are displayed, tomographic images obtained at different positions in a sub-scanning direction may be displayed. In the case of enhancing the quality of and displaying multiple tomographic images obtained by, for example, cross scanning or the like, images in different scanning directions may be displayed. In addition, in the case of enhancing the quality of and displaying multiple tomographic images obtained by, for example, radial scanning or the like, some selected tomographic images (such as two tomographic images at symmetrical positions with respective to a reference line) may be displayed. Furthermore, multiple tomographic images may be displayed on a follow-up display screen, and instructions for image quality enhancement and the analysis result (such as the thickness of a particular layer) may be displayed using a method that is the same as or similar to the above-mentioned method. At this time, the displayed tomographic images may be tomographic images of a certain part of the eye under examination that are obtained at different dates and times, or may be tomographic images obtained at different times on the same examination day. In addition, image quality enhancement processing may be applied to the tomographic images on the basis of information saved in a database using a method that is the same as or similar to the above-mentioned method.

Similarly, in the case of enhancing the quality of and displaying an SLO image, for example, an SLO image displayed on the same display screen may be processed for quality enhancement and displayed. Furthermore, in the case of enhancing the quality of and displaying a frontal image of luminance, for example, a frontal image of luminance displayed on the same display screen may be processed for quality enhancement and displayed. Furthermore, multiple SLO images or frontal images of luminance may be displayed on a follow-up display screen, and instructions for image quality enhancement or the analysis result (such as the thickness of a particular layer) may be displayed using a method that is the same as or similar to the above-mentioned method. In addition, image quality enhancement processing may be applied to SLO images or frontal images of luminance on the basis of information saved in a database using a method that is the same as or similar to the above-mentioned method. Note that displaying of tomographic images, SLO images, and frontal images of luminance is only exemplary, and these images may be displayed in an arbitrary format according to a desired configuration. In addition, at least two of an OCTA frontal image, a tomographic image, an SLO image, or a frontal image of luminance may be processed for quality enhancement and displayed according to instructions given at one time.

With such a configuration, the display control unit 121 may display high quality images obtained by performing image quality enhancement processing on the display unit 116. It may be configured that, if at least one of conditions regarding displaying of high quality images, displaying of the analysis result, and the depth range of displayed frontal images is selected, even when the display screen is changed, the selected condition is maintained. Note that the display control unit 121 may control displaying of various high quality images, the above-mentioned line, and information indicating vascular regions.

In addition, an image quality enhancement model may be used for at least every one frame of a live moving image on a preview screen displayed by the display control unit 121 on the display unit 116. At this time, it may be configured that, in the case where multiple live moving images of different parts or different types are displayed on the preview screen, a learned model corresponding to each live moving image is used. For example, for an anterior segment image used for alignment processing, an image that has been processed for quality enhancement using an image quality enhancement model for anterior segment images may be used. Similarly, for various images used for detecting a certain region in various images, images that have been processed for quality enhancement using image quality enhancement models for the respective images may be used.

At this time, for example, it may be configured that, when the image quality enhancement button is pressed as instructed by the examiner, displaying of multiple live moving images of different types (such as an anterior segment image, an SLO image, and a tomographic image) is (simultaneously) changed to displaying of high quality moving images obtained by processing these moving images for quality enhancement. At this time, the high quality moving images may be displayed by continuously displaying high quality images obtained by processing each frame for quality enhancement. In addition, for example, because images may have different features depending on the type of image, a learned model for image quality enhancement corresponding to each type of image to be processed for quality enhancement may be used. For example, it may be configured that, when the image quality enhancement button is pressed as instructed by the examiner, not only an anterior segment image is processed for quality enhancement using an image quality enhancement model corresponding to anterior segment images, but also an SLO image is processed for quality enhancement using a learned model for image quality enhancement corresponding to SLO images. In addition, for example, it may be configured that, when the image quality enhancement button is pressed as instructed by the examiner, not only the display is changed to a high quality anterior segment image generated using an image quality enhancement model corresponding to anterior segment images, but also the display is changed to a high quality SLO image generated using an image quality enhancement model corresponding to SLO images. In addition, for example, it may be configured that, when the image quality enhancement button is pressed as instructed by the examiner, not only an SLO image is processed for quality enhancement using an image quality enhancement model corresponding to SLO images, but also a tomographic image is processed for quality enhancement using an image quality enhancement model corresponding to tomographic images. In addition, for example, it may be configured that, when the image quality enhancement button is pressed as instructed by the examiner, not only the display is changed to a high quality SLO image generated using an image quality enhancement model corresponding to SLO images, but also the display is changed to a high quality tomographic image generated using a learned model for image quality enhancement corresponding to tomographic images. At this time, it may be configured that a line indicating the position of the tomographic image is displayed superimposed on the SLO image. In addition, it may be configured that the above-mentioned line is moveable on the SLO image according to instructions from the examiner. In addition, it may be configured that, in the case where the display of the image quality enhancement button is active, after the above-mentioned line is moved, the display is changed to a high quality tomographic image obtained by applying image quality enhancement processing to a tomographic image corresponding to the current position of the line. In addition, it may be configured that, if an image quality enhancement button is displayed for each image to be processed for quality enhancement, each image is independently processable for quality enhancement.

Accordingly, for example, even in the case of a live moving image, the processing time may be shortened, and accordingly the examiner may obtain highly accurate information before imaging is started. Therefore, for example, in the case where an operator modifies the alignment position while checking the preview screen, the operator may be less likely to fail in capturing an image again, and the accuracy and efficiency of diagnosis may be improved. In addition, the control unit 117 may control the driving of the above-mentioned scanning means so that a partial region such as an artifact region obtained by segmentation processing or the like will be imaged again (re-scanned) during or at the end of imaging in response to instructions regarding the start of imaging. Depending on the state such as the movement of the eye under examination, a good image may not be captured with a single re-scan. Thus, the driving may be controlled to repeat re-scanning a certain number of times. At this time, it may be configured that, even during re-scanning for a certain number of times, re-scanning is terminated in response to instructions from the operator (such as after pressing of an imaging cancellation button). At this time, it may be configured to save imaging data until termination of re-scanning in response to instructions from the operator. Note that, for example, it may be configured that a confirmation dialog is displayed after the imaging cancellation button is pressed, thereby allowing the operator to select whether to save or discard the imaging data in response to instructions from the operator. In addition, for example, it may be configured that the next re-scan is not performed after the imaging cancellation button is pressed (though the current re-scan is executed until it is completed), and the state enters standby until instructions (input) from the operator are given on the confirmation dialogue. In addition, for example, it may be configured that, if information (such as a numerical value indicating a proportion) indicating the certainty of an object recognition result regarding a part of interest exceeds a threshold, each adjustment or the start of imaging is automatically performed. In addition, for example, it may be configured that, if information (such as a numerical value indicating a proportion) indicating the certainty of an object recognition result regarding a part of interest exceeds a threshold, the state is changed (execution prohibited state is cancelled) to a state where each adjustment or the start of imaging is executable according to instructions from the examiner.

There is a possibility that, during auto-alignment, an imaging target such as the retina of eye E under examination has not been successfully imaged yet. Therefore, because the difference between a medical image input to a learned model and a medical image used as learning data is great, there is a possibility that no high quality image is accurately obtained. Thus, if the evaluation value of the image quality evaluation of a tomographic image (B scan image) exceeds a threshold, it may be configured to automatically start displaying a high quality moving image (continuously displaying high quality frames). In addition, if the evaluation value of the image quality evaluation of a tomographic image exceeds a threshold, it may be configured to change the state to a state where the examiner is allowed to specify the image quality enhancement button (active state). Note that the image quality enhancement button is a button for specifying the execution of image quality enhancement processing. Needless to say, the image quality enhancement button may be a button for giving instructions to display a high quality image.

In addition, it may be configured to prepare a different image quality enhancement model for each imaging mode with a different scanning pattern or the like, and to select a learned model for image quality enhancement corresponding to the selected imaging mode. Alternatively, a single image quality enhancement model obtained by learning data including various medical images obtained in different imaging modes may be used.

In ophthalmic equipment such as an OCT scanner here, the scanning pattern of a luminous flux used for measurement and an imaging part are different for each imaging mode. Therefore, regarding a learned model with a tomographic image as input data, it may be configured to prepare a learned model for each imaging mode, and allow a learned model corresponding to an imaging mode selected according to instructions from the operator to be selected. In this case, the imaging mode may include, for example, a retinal imaging mode, anterior segment imaging mode, vitreous imaging mode, macula imaging mode, optic nerve head imaging mode, and OCTA imaging mode. In addition, the scanning pattern may include 3D scanning, radial scanning, cross scanning, circle scanning, raster scanning, and Lissajous scanning (scanning along the Lissajous curve). Note that, in the OCTA imaging mode, a drive control unit (not illustrated) controls the above-mentioned scanning means to scan the same region (same position) of an eye under examination multiple times with observation light. Also, in the OCTA imaging mode, for example, raster scanning, radial scanning, cross scanning, circle scanning, or Lissajous scanning may be set as a scanning pattern. In addition, for a learned model with a tomographic image as input data, learning may be performed using a tomographic image in accordance with a cross section in a different direction as learning data. For example, learning may be performed using a tomographic image of a cross section in the xz direction or a tomographic image of a cross section in the yz direction as learning data.

Note that whether it is necessary to execute image quality enhancement processing using an image quality enhancement model (or to display a high quality image obtained by performing image quality enhancement processing) may be determined in accordance with instructions given by the operator for the image quality enhancement button provided on the display screen, or in accordance with settings stored in advance in the storage unit 114. Note that the fact that the processing is for image quality enhancement using a learned model (image quality enhancement model) may be displayed using the active state of the image quality enhancement button, or may be displayed as a message on the display screen. In addition, execution of image quality enhancement processing may maintain the execution state upon the last activation of the ophthalmic equipment, or may maintain the execution state upon the last examination of each subject.

In addition, a moving image to which various learned models such as an image quality enhancement model are applicable is not limited to a live moving image, and may be, for example, a moving image stored (saved) in the storage unit 114. At this time, for example, a moving image obtained by performing alignment for at least every one frame of a tomographic moving image of the fundus stored (saved) in the storage unit 114 may be displayed on the display screen. For example, to observe the vitreous body in a suitable manner, a reference frame based on a condition that there is as much vitreous body as possible on the frame may be selected at first. At this time, each frame is a tomographic image (B scan image) in the XZ direction. A moving image obtained by aligning other frames in the XZ direction to the selected reference frame may be displayed on the display screen. At this time, for example, it may be configured to continuously display high quality images (high quality frames) sequentially generated by an image quality enhancement model for at least every one frame of the moving image.

Note that, regarding the above-mentioned frame-to-frame alignment method, the same method or totally different methods are applied to the method of alignment in the X direction and the method of alignment in the Z direction (depth direction). In addition, alignment in one direction may be performed multiple times using different methods. For example, rough alignment and then precise alignment may be performed. In addition, examples of the alignment method include (rough) alignment (in the Z direction) using a retinal layer boundary obtained by applying segmentation processing to a tomographic image (B scan image), (precise) alignment (in the X direction or Z direction) using correlation information (similarity) between multiple regions obtained by dividing the tomographic image and a reference image, alignment (in the X direction) using a one-dimensional projection image generated for each tomographic image (B scan image), and alignment (in the X direction) using a two-dimensional frontal image. In addition, it may be configured that rough alignment is performed in units of pixels and then precise alignment is performed in units of sub-pixels.

In addition, an image quality enhancement model may be updated by additional learning using a proportion value set (changed) in response to instructions from the examiner. For example, if the examiner tends to set a high proportion to an input image with respect to a high quality image when the input image is relatively dark, the learned model performs additional learning to take such tendency. Accordingly, for example, the learned model may be customized as one that obtains a proportion of merger that suits the examiner's taste. At this time, a button for determining whether to use the set (changed) proportion value in response to instructions from the examiner may be displayed on the display screen. In addition, it may be configured that a proportion determined using a learned model is set as a default value, and then the proportion value is changeable from the default value according to instructions from the examiner. In addition, an image quality enhancement model may be a learned model obtained by performing additional learning of learning data at least including a high quality image generated using the image quality enhancement model. At this time, it may be configured that whether to use the high quality image as learning data for additional learning is selectable according to instructions from the examiner.

(Fourth Modification)

In the above-described various embodiments and modifications, for an image obtained by imaging, the control unit 117 may generate a label image using a learned model for image segmentation, and perform image segmentation processing. Here, the label image refers to a label image where the label of a region is given in units of pixels of the tomographic image. Specifically, the label image is an image where, of a group of regions rendered in the obtained image, an arbitrary region is separated by a group of identifiable pixel values (hereinafter, label values). Here, the identified arbitrary region includes a region of interest or a volume of interest (VOI).

When a coordinate group of pixels having an arbitrary label value is identified from the image, a coordinate group of pixels rendering a region such as a corresponding retinal layer in the image may be identified. Specifically, for example, if the label value indicating the ganglion cell layer constituting the retina is 1, a coordinate group whose pixel value is 1 is identified from pixel groups of the image, and a pixel group corresponding to the coordinate group is extracted from the image. Accordingly, the region of the ganglion cell layer may be identified in the image.

Note that the image segmentation processing may include processing to reduce or enlarge the size of a label image. At this time, it is assumed that, as an image completion processing method used for reducing or enlarging the size of a label image, the nearest neighbor algorithm, which does not erroneously generate an undefined label value or a label value that does not exist at corresponding coordinates, will be used.

The image segmentation processing refers to processing of identifying a region called an ROI (Region of Interest) or VOI, such as an organ or lesion rendered in the image, to be used for image diagnosis or image analysis. For example, according to the image segmentation processing, a region group of a layer group constituting the retina may be identified from an image obtained by imaging the posterior segment, which serves as an imaging target, using OCT. If no region to be identified is rendered in the image, the number of identified regions is 0. Alternatively, if multiple region groups to be identified are rendered in the image, the number of identified regions may be plural, or there may be a single region surrounding the region groups.

The identified region groups are output as information usable for other processing. Specifically, for example, a coordinate group of a pixel group constituting each of the identified region groups may be output as a numerical value data group. In addition, for example, a coordinate group indicating a rectangular region, elliptical region, cuboid region, ellipsoid region, or the like including each of the identified region groups may be output as a numerical value data group. Furthermore, for example, a coordinate group indicating a line, curve, plane, curved surface, or the like at the boundary of the identified region groups may be output as a numerical value data group. In addition, for example, a label image indicating the identified region groups may be output.

Figure 9:
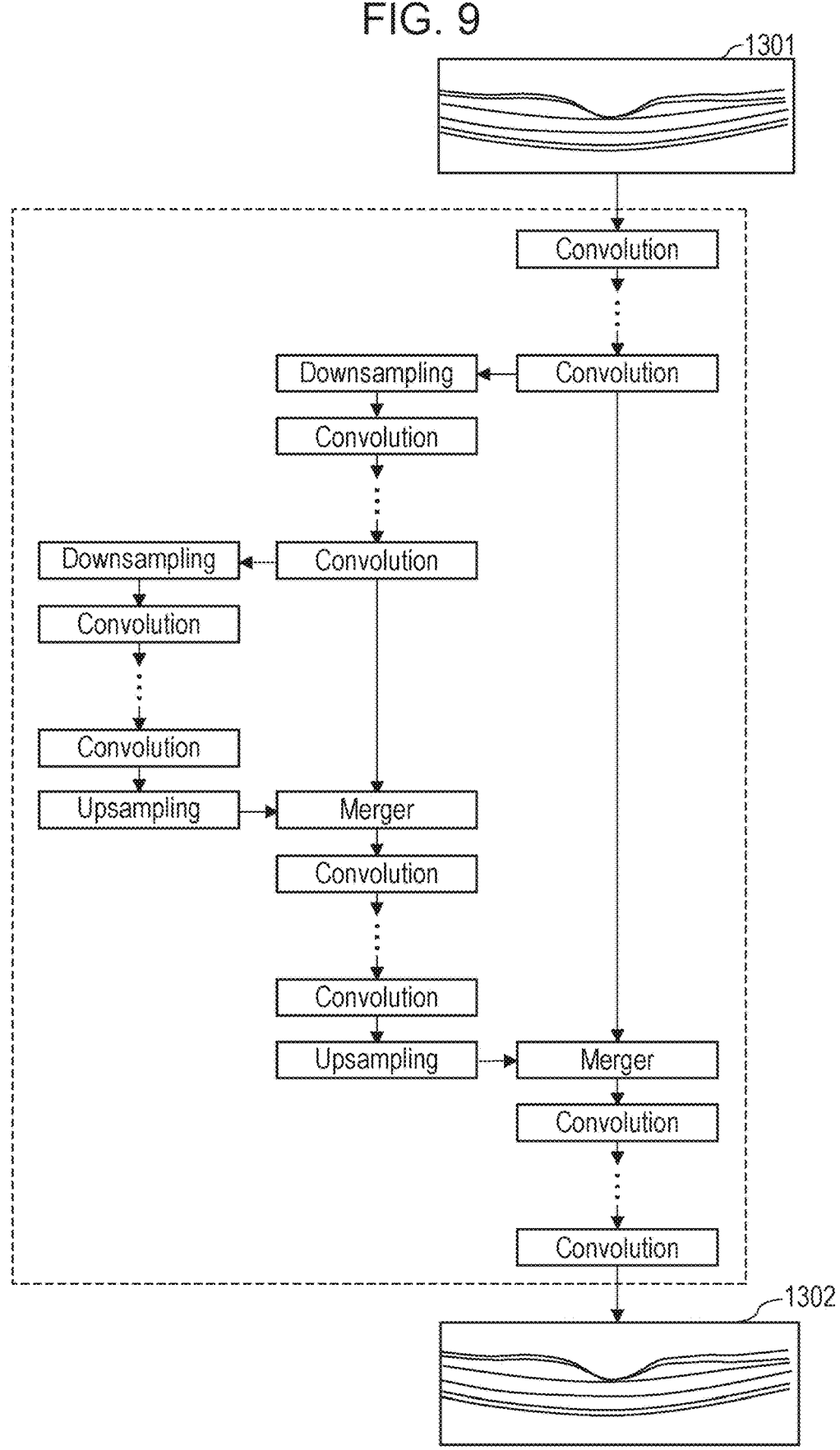
FIG. 9 is a diagram illustrating an example of the configuration of neural networks used as a machine learning model according to a fourth modification.

Here, as a machine learning model for image segmentation, for example, a convolutional neural network (CNN) may be used. Here, referring to FIG. 9, an example where a machine learning model according to the present modification is configured by CNN will be described. FIG. 9 illustrates an example of the configuration of a learned model for image segmentation. In the example of the learned model, for example, in response to an input of a tomographic image 1301, a label image 1302 indicating an identified region group may be output.

The machine learning model illustrated in FIG. 9 includes multiple layer groups responsible for a process of processing an input value group and outputting the result. As the types of layers included in the configuration of this machine learning group, there are a convolution layer, downsampling layer, upsampling layer, and merger layer.

The convolution layer is a layer for performing convolution processing on the input value group according to parameters such as the set filter kernel size, number of filters, stride value, and dilation value. Note that the number of dimensions of the filter kernel size may be changed according to the number of dimensions of the input image.

The downsampling layer is a layer for performing processing to reduce the number of output value groups to be less than the number of input value groups by decimating or combining the input value groups. Specifically, as such processing, for example, there is Max Pooling.

The upsampling layer is a layer for performing processing to increase the number of output value groups to be greater than the number of input value groups by duplicating the input value groups or adding values interpolated from the input value groups. Specifically, as such processing, for example, there is linear interpolation processing.

The merger layer is a layer for performing merging processing by receiving, from multiple sources, a value group such as an output value group of a certain layer or a pixel group constituting the image, and connecting or adding them together.

It shall be noted that, if parameter settings for a layer group or a node group constituting a neural network are different, how much a tendency trained from training data is reproducible in output data may differ. In short, because appropriate parameters are different in many cases depending on the form of implementation, they may be changed to preferred values, as necessary.

In addition, CNN may have better characteristics not only by the method of changing the parameters as described above, but also by changing the configuration of CNN. The better characteristics mean that, for example, information of the more precise alignment position is output, the processing time is shorter, or it takes a short time to train the machine learning model.

Note that the configuration of CNN used in the present modification is a U-net machine learning model that has the function of an encoder with multiple layers including multiple downsampling layers, and the function of a decoder with multiple layers including multiple upsampling layers. The U-net machine learning model is configured such that position information (spatial information) that is ambiguous in multiple layers configured as an encoder is usable in layers of the same dimensions (layers corresponding to each other) of multiple layers configured as a decoder.

Though not illustrated in the drawings, as a changed example of the configuration of CNN, for example, a batch normalization layer or an activation layer using a normalized linear function (Rectifier Linear Unit) may be incorporated after the convolution layer. Through such steps of CNN, features of a captured image may be extracted.

As the machine learning model according to the present modification, for example, CNN (U-net machine learning model) as illustrated in FIG. 9, a model combining CNN and LSTM, FCN (Fully Convolutional Network), or SegNet may be used. In addition, a machine learning model that performs object recognition may be used according to a desired configuration. As the machine learning model which performs object recognition, for example, RCNN (Region CNN), fast RCNN, or faster RCNN may be used. Furthermore, a machine learning model that performs object recognition in units of regions may also be used. As the machine learning model which performs object recognition in units of regions, YOLO (You Only Look Once) or SSD (Single Shot Detector or Single Shot Multi Box Detector) may be used.

In addition, learning data of a machine learning model for image segmentation includes a tomographic image obtained by OCT as input data, and a label image where a region label is attached in units of pixels of the tomographic image as output data. As the label image, a label image labeled, for example, the inner limiting membrane (ILM), nerve fiber layer (NFL), ganglion cell layer (GCL), junction of the inner segment and outer segment (ISOS) of photoreceptor cells, retinal pigment epithelial layer (RPE), Bruch's membrane (BM), and choroid may be used. Note that an image labeled, as other regions, the vitreous body, sclera, outer plexiform layer (OPL), outer nuclear layer (ONL), inner plexiform layer (IPL), inner nuclear layer (INL), cornea, anterior chamber, iris, and lens may also be used.

In addition, the input data of a machine learning model for image segmentation is not limited to a tomographic image. An anterior segment image, SLO image, or OCTA image may be used. In this case, learning data may include various images as input data, and a label image labeled a region name in units of pixels of these various images as output data. For example, in the case where the input data of learning data is an SLO image, the output data may be an image labeled the periphery of the optic nerve head, Disc, Cup, etc.

Note that the label image used as the output data may be an image where each region of a tomographic image is labeled by a physician or the like, or an image where each region is labeled by rule-based region detection processing. If machine learning is performed using a label image that has not been appropriately labeled as output data of learning data, an image obtained using a learned model that has done learning using this learning data may also become a label image that has not been appropriately labeled. Therefore, by excluding a pair including such a label image from learning data, the likelihood of producing an inappropriate label image using the learned model may be reduced. Here, the rule-based region detection processing refers to, for example, detection processing using known regularity such as the regularity of the shape of the retina.

By performing image segmentation processing using such a learned model for image segmentation, the control unit 117 is expected to detect a specific region of various images quickly and accurately. Note that a learned model for image segmentation may be prepared for each type of various images serving as input data. In addition, for OCTA frontal images and En-Face images, a learned model may be prepared for each depth range for generating an image. Furthermore, a learned model for image segmentation may be a learned model that has learned images of each imaging part (such as the central of the macula or the center of the optic nerve head) or a learned model that has done learning regardless of the imaging part.

In addition, for a learned model for image segmentation, additional learning may be performed using data modified manually according to instructions from the operator as learning data. In addition, whether to perform additional learning or whether to send data to a server may be determined using the same or similar method. In these cases, it may be expected that the accuracy of each process is improved, or processing according to the tendency of the examiner's taste is performed.

Furthermore, in the case where the control unit 117 detects partial regions (such as a part of interest, artifact region, abnormal part, etc.) of eye E under examination using a learned model, the control unit 117 may apply certain image processing to each of the detected partial regions. For example, the case of detecting at least two partial regions among the vitreous region, retina region, or choroidal region will be discussed. In this case, when applying image processing such as contrast adjustment to the detected at least two partial regions, the control unit 117 may perform adjustment suitable for each region by using different parameters of image processing. By displaying an image where adjustment suitable for each region has been performed, the operator may more appropriately diagnose a disease or the like in each partial region. Note that the configuration of using different parameters of image processing for each detected partial region is similarly applicable to partial regions of eye E under examination that are obtained by detecting the partial regions of eye E under examination without using a learned model.

(Fifth Modification)

The display control unit 121 in the above-described various embodiments and modifications may display the analysis result, such as the thickness of a desired layer or the density of various blood vessels, on a report screen on the display screen after a tomographic image is captured. In addition, the values (distribution) of a parameter regarding a part of interest that includes at least one of the optic nerve head, macula, vascular region, capillary region, arterial region, venous region, bundle of nerve fibers, vitreous region, macular region, choroidal region, scleral region, lamina cribrosa region, retinal layer boundary, ends of the retinal layer boundary, photoreceptor cells, blood cells, vascular walls, vascular inner wall boundary, vascular outer boundary, ganglion cells, corneal region, corner region, or Schlemm's canal may be displayed as the analysis result. Here, the part of interest may be, for example, vorticose veins, which are the outflow of blood vessels in the Haller layer (exemplary blood vessels in a depth range of part of the choroidal region) to the outside of the eye. At this time, exemplary parameters regarding the part of interest include the number of vorticose veins (such as the number in each region), the distance from the optic nerve head to each vorticose vein, and the angle at which each vorticose vein is positioned around the optic nerve head. Accordingly, various diseases (such as choroidal neovascularization) regarding Pachychoroid (thickened choroid), for example, may be accurately diagnosed. In addition, by analyzing a medical image that has been processed to reduce various artifacts, the above-mentioned various analysis results may be displayed as accurate analysis results. Note that the artifacts may be, for example, a false image region generated by light absorption by vascular regions or the like, a projection artifact, and a band-shaped artifact in a frontal image that occurs in the main scanning direction of measurement light depending on the state of the eye under examination (movement, blinking, or the like). In addition, the artifacts may be anything as long as they are, for example, imaging failure regions that randomly occur on a medical image of the subject's certain part whenever the image is captured. In addition, the display control unit 121 may display, as an analysis result, the values (distribution) of a parameter regarding a region that includes at least one of various artifacts (imaging failures) as described above on the display unit 116. In addition, the display control unit 121 may display, as an analysis result, the values (distribution) of a parameter regarding a region that includes at least one of abnormal parts such as drusen, neovascular vessels, vitiligo (hard exudates), and pseudo-drusen. In addition, a comparison result obtained by comparing standard values and a standard range obtained using a standard database with an analysis result may be displayed.

In addition, an analysis result may be displayed using an analysis map or sectors indicating statistical values corresponding to divided regions. Note that an analysis result may be one generated using a learned model (an analysis result generating engine, a learned model for analysis result generation) obtained by performing learning using the analysis result of a medical image as learning data. At this time, the learned model may be one obtained by learning using learning data that includes a medical image and the analysis result of the medical image, or learning data that includes a medical image and the analysis result of a medical image of a different type from the foregoing medical image.

In addition, learning data for performing an image analysis may be one that includes a label image generated using a learned model for image segmentation processing, and the analysis result of a medical image using the label image. In this case, the control unit 117 may function as an example of an analysis result generating unit that generates the analysis result of a tomographic image from the result of image segmentation processing by using, for example, a learned model for analysis result generation. Furthermore, the learned model may be one obtained by learning using learning data that includes input data with a set of medical images of different types of a certain part, like a later-described En-Face image and motion contrast frontal image (En-Face image of OCTA).

In addition, it may be configured to display an analysis result obtained using a high quality image generated using an image quality enhancement model. In this case, input data included in learning data may be a high quality image generated using a learned model for image quality enhancement, or a set of a low quality image and a high quality image. Note that the learning data may be an image obtained by correcting, manually or automatically, at least part of an image whose quality has been enhanced using the learned model.

In addition, the learning data may be data obtained by labeling (annotating) input data with, as correct answer data (of supervised learning), information that includes at least one of an analysis value (e.g., mean, median, etc.) obtained by analyzing an analysis region, a table including the analysis value, an analysis map, or the position of the analysis region such as a sector in the image. Note that it may be configured to display an analysis result obtained using a learned model for analysis result generation in response to instructions from the operator.

In addition, the estimation unit 119 in the above-described embodiments and modifications may output an accurate estimation result by using, for example, an image that has been processed to reduce above-described various artifacts, for estimation processing. In addition, the display control unit 121 may output the estimation result by displaying the position of an identified abnormal part or the like on the image, or by displaying the state of the abnormal part in text. Furthermore, the display control unit 121 may display, apart from the estimation result of the disease, the classification result (such as Curtin's classification) of an abnormal part as a diagnostic result. In addition, as the classification result, for example, information (such as a numerical value indicating a proportion) indicating the certainty of each abnormal part may be displayed. In addition, information necessary for a physician to confirm the diagnosis may be displayed as a diagnostic result. For example, an advice for additional imaging is considered as an example of the above-mentioned necessary information. For example, in response to detection of an abnormal part in a vascular region of an OCTA image, an advice for additional photofluorography using a contrast agent that allows more detailed observation of blood vessels than OCTA may be displayed. In addition, the diagnostic result may be information regarding, for example, the future medical treatment policy for the subject. In addition, the diagnostic result may be information that includes at least one of, for example, the diagnosis name, the type and state (degree) of a lesion (abnormal part), the position of the lesion in the image, the position of the lesion relative to the region of interest, findings (interpretation findings, etc.), basis for the diagnosis name (positive medical support information, etc.), or basis for denying the diagnosis name (negative medical support information). At this time, for example, a diagnostic result that seems to be more certain than a diagnostic result such as a diagnosis name input according to instructions from the examiner may be displayed as medical support information. In addition, in the case where multiple types of medical images are used, for example, a type of medical image that may be the basis for the diagnostic result may be displayed distinguishably. In addition, the basis for the diagnostic result may be a map (attention map or activation map) that visualizes a feature extracted by a learned model, which may be, for example, a color map (heat map) that indicates the feature in color. At this time, for example, the heat map may be displayed superimposed on a medical image serving as input data. Note that the heat map may be obtained by using, for example, Grad-CAM (Gradient-weighted Class Activation Mapping), which is a method for visualizing a region with a greater contribution to an output value of a predicted (estimated) class (a region with a greater gradient), Guided Grad-CAM, or the like.

Note that the diagnostic result may be one generated using a learned model (a diagnostic result generating engine, a learned model for diagnostic result generation) obtained by learning the diagnostic result of a medical image as learning data. In addition, the learned model may be one obtained by learning using learning data that includes a medical image and the diagnostic result of the medical image, or learning data that includes a medical image and the diagnostic result of a medical image of a different type from the foregoing medical image.

In addition, learning data may be one that includes a label image generated using a learned model for image segmentation processing, and the diagnostic result of a medical image using the label image. In this case, the control unit 117 may function as an example of a diagnostic result generating unit that generates the diagnostic result of a tomographic image from the result of image segmentation processing by using, for example, a learned model for diagnostic result generation.

Furthermore, it may be configured to display a diagnostic result obtained using a high quality image generated using a learned model for image quality enhancement. In this case, input data included in learning data may be a high quality image generated using a learned model for image quality enhancement, or a set of a low quality image and a high quality image. Note that the learning data may be an image obtained by correcting, manually or automatically, at least part of an image whose quality has been enhanced using the learned model.

In addition, the learning data may be data obtained by labeling (annotating) input data with, as correct answer data (of supervised learning), information that includes at least one of, for example, the diagnosis name, the type and state (degree) of a lesion (abnormal part), the position of the lesion in the image, the position of the lesion relative to the region of interest, findings (interpretation findings, etc.), basis for the diagnosis name (positive medical support information, etc.), or basis for denying the diagnosis name (negative medical support information). Note that it may be configured to display a diagnostic result obtained using a learned model for diagnostic result generation in response to instructions from the operator.

Note that a learned model may be prepared for each item or each type of information used as input data, and a diagnostic result may be obtained using the learned model. In this case, statistical processing may be performed on information output from each learned model to determine a final diagnostic result. For example, the proportion of information output from each learned model may be added for each type of information, and information with a higher sum proportion than other information may be determined as a final diagnostic result. Note that the statistical processing is not limited to calculation of the sum, and may be calculation of the mean or median. In addition, for example, a diagnostic result may be determined using, among items of information output from the individual learned models, information with a higher proportion (information with the highest proportion) than other information. Similarly, a diagnostic result may be determined using, among items of information output from the individual learned models, information whose proportion is greater than or equal to a threshold.

In addition, it may be configured that whether the determined diagnostic result is good or bad is determinable (approvable) according to instructions (selection) from the operator. In addition, a diagnostic result may be determined from items of information that are output from the individual learned models according to instructions (selection) from the operator. At this time, for example, the display control unit 121 may display items of information output from the individual learned models and their proportions side by side on the display unit 116. It may be configured that, when the operator selects information with a higher proportion than other information, the selected information is determined as a diagnostic result. Furthermore, a diagnostic result may be determined from items of information that are output from the individual learned models using a machine learning model. In this case, the machine learning algorithm may be the machine learning algorithm of a type different from a machine learning algorithm used for diagnostic result generation, and, for example, neural networks, support vector machines, AdaBoost, Bayesian networks, or random forests may be used.

Note that learning of the above-mentioned various learned models may not only be supervised learning (learning with labeled learning data), but also semi-supervised learning. Semi-supervised learning is a method where, for example, after identifiers (classifiers) each perform supervised learning and the identifiers (classifiers) identify (classify) unlabeled learning data, automatic labeling (annotation) (of, for example, identification results whose certainty is greater than or equal to a threshold) is performed according to the reliability of the identification results (classification results), and learning is performed using the labeled learning data. Semi-supervised learning may be, for example, co-training or multiview. At this time, a learned model for diagnostic result generation may be, for example, a learned model obtained by semi-supervised learning (such as co-training) using a first identifier that identifies a medical image of a normal object under examination and a second identifier that identifies a medical image including a specific lesion. Note that diagnosis is not the only possible purpose, and the purpose may be, for example, supporting imaging or the like. In this case, the second identifier may be one that identifies, for example, a medical image including a partial region such as a part of interest or an artifact region.

The display control unit 121 according to the above-described various embodiments and modifications may display, on a report screen of the display screen, the object recognition result (object detection result) or segmentation result of a partial region such as a part of interest, an artifact region, and an abnormal part as described above. At this time, for example, a rectangular frame or the like may be displayed superimposed around the object in the image. In addition, for example, color or the like may be displayed superimposed on the object in the image. Note that the object recognition result or segmentation result may be one generated by using a learned model (an object recognition engine, a learned model for object recognition, a segmentation engine, a learned model for segmentation) obtained by learning learning data obtained by labeling (annotating) a medical image with, as correct answer data, information that indicates the object recognition or segmentation. Note that the above-mentioned analysis result generation or diagnostic result generation may be one obtained by using the above-mentioned object recognition result or segmentation result. For example, processing of analysis result generation or diagnostic result generation may be performed on a part of interest obtained by processing of object recognition or segmentation.

To detect an abnormal part, the control unit 117 may use a generative adversarial network (GAN) or a variational auto-encoder (VAE). For example, DCGAN (Deep Convolutional GAN) including a generator obtained by learning medical image generation and an identifier obtained by learning the distinction between a new medical image generated by the generator and a real medical image may be used as a machine learning model.

In the case of using DCGAN, for example, the identifier encodes an input medical image to a latent variable, and the generator generates a new medical image on the basis of the latent variable. After that, the difference between the input medical image and the generated new medical image may be extracted (detected) as an abnormal part. In the case of using VAE, for example, the encoder encodes an input medical image to a latent variable, and the decoder decodes the latent variable to generate a new medical image. After that, the difference between the input medical image and the generated new medical image may be extracted as an abnormal part.

Furthermore, the control unit 117 may detect an abnormal part by using a convolutional auto-encoder (CAE). In the case of using CAE, the same medical image is learned as input data and output data at the time of learning. Accordingly, in response to an input of a medical image that has an abnormal part at the time of estimation to the CAE, a medical image having no abnormal part is output in accordance with the learning tendency. After that, the difference between the medical image input to the CAE and the medical image output from the CAE may be extracted as an abnormal part.

In these cases, the control unit 117 may generate, as information regarding the abnormal part, information regarding the difference between a medical image obtained using a generative adversarial network or an auto-encoder and a medical image input to the generative adversarial network or the auto-encoder. Accordingly, the control unit 117 may be expected to detect an abnormal part quickly and accurately. For example, even when it is difficult to collect many medical images including abnormal parts as learning data in order to improve the accuracy of detecting abnormal parts, images of normal objects under examination that are relatively numerous and easy to collect may be used as learning data. Therefore, for example, learning for accurately detecting an abnormal part may be efficiently performed. Here, the auto-encoder includes VAE and CAE. In addition, the generator of the generative adversarial network may partially include VAE. Accordingly, for example, a relatively clear image may be generated while reducing the phenomenon of generating similar data. For example, the control unit 117 may generate, as information regarding an abnormal part, information regarding the difference between a medical image obtained from various medical images using a generative adversarial network or an auto-encoder and a medical image input to the generative adversarial network or the auto-encoder. In addition, for example, the display control unit 121 may display, as information regarding an abnormal part, on the display unit 116, information regarding the difference between a medical image obtained from various medical images using a generative adversarial network or an auto-encoder and a medical image input to the generative adversarial network or the auto-encoder.

In addition, a learned model for diagnostic result generation in particular may be a learned model obtained by learning learning data including input data with a set of different types of medical images of the subject's certain part. At this time, for example, input data with a set of a motion contrast frontal image of the fundus and a luminance frontal image (or luminance tomographic image) is considered as input data included in learning data. Alternatively, for example, input data with a set of a tomographic image (B scan image) of the fundus and a color fundus image (or photofluorographic fundus image) is also conceivable as input data included in learning data. In addition, different types of medical images may be anything as long as they are obtained by different modalities, different optical systems, different principles, or the like.

In addition, a learned model for diagnostic result generation in particular may be a learned model obtained by learning learning data including input data with a set of different types of medical images of the subject's certain part. At this time, for example, input data with a set of a tomographic image (B scan image) of the fundus and a tomographic image (B scan image) of the anterior segment is conceivable as input data included in learning data. Alternatively, for example, input data with a set of a three-dimensional OCT image (three-dimensional tomographic image) of the macular of the fundus and a circle scan (or raster scan) tomographic image of the optic nerve head of the fundus is also conceivable as input data included in learning data.

Note that input data included in learning data may be medical images of the subject's different parts and different types. At this time, for example, input data with a set of a tomographic image of the anterior segment and a color fundus image is conceivable as input data included in learning data. In addition, the above-mentioned learned model may be a learned model obtained by learning learning data including input data with a set of medical images of the subject's certain part at different imaging angles of view. In addition, input data included in learning data may be one obtained by attaching together medical images obtained by time-dividing a certain part into multiple regions, as in a panoramic image. At this time, by using an image with a wide angle of view, such as a panoramic image, as learning data, there is a possibility that the feature of the image may be accurately obtained because the amount of information is larger than that of an image with a narrow angle of view. Accordingly, the processing result may be improved. In addition, input data included in learning data may be input data with a set of medical images of the subject's certain part at different dates and times.

In addition, the display screen where at least one of the above-mentioned estimation result, analysis result, diagnostic result, object recognition result, or segmentation result is displayed is not limited to the report screen. Such a display screen may be displayed on at least one of, for example, an imaging confirmation screen, a follow-up display screen, or a preview screen for various adjustments before imaging (a display screen where various live moving images are displayed). For example, by displaying at least one of the above-mentioned results obtained using the above-mentioned learned model on the imaging confirmation screen, the operator may check the accurate result even immediately after the imaging.

In addition, for example, it may be configured that, in response to recognition of a specific object, a frame surrounding the recognized object is displayed superimposed on a live moving image. At this time, if information (such as a numerical value indicating a proportion) indicating the certainty of the object recognition result exceeds a threshold, the object recognition result may be highlighted by, for example, changing the color of the frame surrounding the object. Accordingly, the examiner may easily identify the object on the live moving image.

For generation of correct answer data used for learning of the above-mentioned various learned models, a learned model for correct answer data generation for generating correct answer data, such as labeling (annotation), may be used. At this time, a learned model for correct answer data generation may be one obtained by (sequentially) additionally learning correct answer data obtained by labeling (annotation) done by the examiner. That is, a learned model for correct answer data generation may be one obtained by additionally learning learning data including unlabeled data as input data and labeled data as output data. In addition, it may be configured that, in consecutive frames of a moving image or the like, the result of object recognition or segmentation of frames before and after a certain frame is taken into consideration, and the result of a frame determined to be of low result accuracy is modified. At this time, it may be configured that additional learning of the modified result as correct answer data is performed in response to instructions from the examiner. In addition, it may be configured that, for example, for a medical image with a low result accuracy, additional learning is performed using, as input data, an image labeled (annotated) while the examiner checks a color map (heat map) indicating a feature in color, which is an example of a map (attention map or activation map) that visualizes a feature extracted by a learned model on the medical image. For example, if a point of interest differs from what the examiner intends on a heat map on a layer immediately before outputting the result in the learned model, a medical image in which the examiner's point of interest is labeled (annotated) may be additionally learned. Accordingly, for example, the learned model may additionally learn the feature of a partial region of the medical image, which has a relatively great influence on the output result of the learned model, with preference (weighted) over other regions.

Here, the above-mentioned various learned models may be obtained by machine learning using learning data. An example of machine learning includes deep learning including neural networks of multiple layers. In addition, for example, convolutional neural networks may be used for at least some of the neural networks of multiple layers. In addition, technology regarding an auto-encoder may be used for at least some of the neural networks of multiple layers. In addition, technology regarding backpropagation may be used for learning. In addition, a method (dropout) of randomly deactivating each unit (each neuron or each node) may be used for learning. In addition, a method (batch normalization) of normalizing, before application of an activation function (such as the ReLu function), data transferred to each layer of the neural networks of multiple layers may be used for learning. Note that machine learning is not limited to deep learning, and may be any type of learning as long as it uses a model capable of extracting (representing), by itself, a feature of learning data such as an image by learning. Here, a machine learning model refers to a learning model based on a machine learning algorithm such as deep learning. In addition, a learned model is a model obtained by training beforehand (doing learning of) a machine learning model based on an arbitrary machine learning algorithm using appropriate learning data. Note that it is assumed that a learned model is not a model that performs no further learning, but is a model that may perform additional learning. In addition, learning data includes a pair of input data and output data (correct answer data). Here, learning data may sometimes be referred to as training data, and correct answer data may sometimes be referred to as training data.

Note that a GPU may efficiently perform operation by processing more items of data in parallel. Therefore, in the case of performing learning multiple times using a learning model as in deep learning, it is effective to perform processing using a GPU. Thus, in the present modification, a GPU in addition to a CPU is used for processing by the control unit 117, which is an example of a learning unit (not illustrated). Specifically, in execution of a learning program including a learning model, the CPU and GPU collaboratively operate to perform learning. Note that the processing of the learning unit may be performed by operations of only the CPU or GPU. In addition, a processor (estimation unit 119) that executes processing using the above-mentioned various learned models may use a GPU, like the learning unit. In addition, the learning unit may include an error detection unit and an update unit (not illustrated). The error detection unit obtains an error between output data output from an output layer of a neural network in response to input data input to an input layer, and correct answer data. The error detection unit may calculate an error between output data from a neural network and correct answer data using a loss function. In addition, the update unit updates, on the basis of an error obtained by the error detection unit, a coupling weight coefficient between nodes of a neural network so as to reduce the error. The update unit updates the coupling weight coefficient using, for example, backpropagation. Backpropagation is a method of adjusting the coupling weight coefficient between nodes of each neural network so as to reduce the above-mentioned error.

In addition, as a machine learning model used for the above-mentioned object recognition, segmentation, or image quality enhancement, a U-net machine learning model that has the function of an encoder with multiple layers including multiple downsampling layers, and the function of a decoder with multiple layers including multiple upsampling layers, is applicable. The U-net machine learning model is configured such that position information (spatial information) that is made ambiguous in multiple layers configured as an encoder is usable in layers of the same dimensions (layers corresponding to each other) of multiple layers configured as a decoder.

In addition, as a machine learning model used for the above-mentioned object recognition, segmentation, or image quality enhancement, for example, FCN (Fully Convolutional Network) or SegNet is usable. In addition, a machine learning model that performs object recognition in units of regions according to a desired configuration may be used. As the machine learning model which performs object recognition, for example, RCNN (Region CNN), fast RCNN, or faster RCNN may be used. Furthermore, as the machine learning model which performs object recognition in units of regions, YOLO (You Only Look Once) or SSD (Single Shot Detector or Single Shot Multi Box Detector) may be used.

In addition, the machine learning model may be, for example, a capsule network (CapsNet). Here, in general neural networks, each unit (each neuron or each node) is configured to output a scalar value, thereby reducing, for example, spatial information regarding a spatial positional relationship between (relative positions of) features in an image. Accordingly, for example, learning may be performed so as to reduce the influence of local distortion or translation of the image. In contrast, in capsule networks, each unit (each capsule) is configured to output spatial information as a vector, thereby maintaining, for example, spatial information. Accordingly, for example, learning may be performed so as to take into consideration the spatial positional relationship between features in the image.

(Sixth Modification)

On the preview screen in the above-described various embodiments and modifications, it may be configured that the above-mentioned various learned models are used for at least every one frame of a live moving image. At this time, it may be configured that, in the case where multiple live moving images of different parts or different types are displayed on the preview screen, a learned model corresponding to each live moving image is used. Accordingly, for example, even in the case of a live moving image, the processing time may be shortened, and accordingly the examiner may obtain highly accurate information before imaging is started. Therefore, for example, it becomes less likely to fail in capturing an image again, and the accuracy and efficiency of diagnosis may be improved.

Note that multiple live moving images may be, for example, moving images of the anterior segment for alignment in the XYZ directions, and frontal moving images of the fundus for focus adjustment of the fundus observation optical system or for OCT focus adjustment. In addition, multiple live moving images may be, for example, tomographic moving images of the fundus for OCT coherence gate adjustment (adjustment of the optical path length difference between a measurement light path length and a reference light path length). In the case where such a preview image is displayed, the control unit 117 may be configured to perform the above-mentioned various adjustments so that a region detected using the above-described learned model for object recognition or learned model for segmentation will satisfy a certain condition. For example, it may be configured that various adjustments including OCT focus adjustment are performed so that a value (such as a contrast value or an intensity value) regarding a vitreous region or a certain retinal layer such as RPE detected using a learned model for object recognition or a learned model for segmentation will exceed a threshold (or become a peak value). In addition, for example, it may be configured that OCT coherence gate adjustment is performed so that a vitreous region or a certain retinal layer such as RPE detected using a learned model for object recognition or a learned model for segmentation will be at a certain position in the depth direction.

In these cases, the control unit 117 may process a moving image for quality enhancement using a learned model, and generate a high quality moving image. In addition, the drive control unit (not illustrated) may control the driving of an optical member for changing the imaging range of a reference mirror or the like so that, while a high quality moving image is displayed, a partial region such as a part of interest obtained by segmentation processing or the like will be at a certain position in a display region. In such a case, the drive control unit may automatically perform alignment processing so that a desired region will be at a desired position in a display region on the basis of accurate information. Note that the optical member whose imaging range is to be changed may be, for example, an optical member for adjusting the coherence gate position, which may specifically be a reference mirror that reflects reference light. In addition, the coherence gate position may be adjusted by an optical member that changes the optical path length difference between the measurement light path length and the reference light path length, and the optical member may be a mirror for changing the optical path length of measurement light (not illustrated). Note that the optical member for changing the imaging range may be, for example, a stage unit (not illustrated). In addition, the drive control unit may control the driving of scanning means so that a partial region such as an artifact region obtained by segmentation processing or the like will be imaged again (re-scanned) during or at the end of imaging in response to instructions regarding the start of imaging. In addition, for example, it may be configured to automatically perform various adjustments or start imaging if information (such as a numerical value indicating a proportion) indicating the certainty of an object recognition result regarding a part of interest exceeds a threshold. In addition, for example, it may be configured that, if information (such as a numerical value indicating a proportion) indicating the certainty of an object recognition result regarding a part of interest exceeds a threshold, the state is changed (the execution prohibited state is cancelled) to a state where each adjustment or the start of imaging is executable according to instructions from the examiner.

In addition, a moving image to which the above-mentioned various learned models are applicable is not limited to a live moving image, and may be, for example, a moving image stored (saved) in the storage unit 114. At this time, for example, a moving image obtained by performing alignment for at least every one frame of a tomographic moving image of the fundus stored (saved) in the storage unit 114 may be displayed on the display screen. For example, to observe the vitreous body in a suitable manner, a reference frame based on a condition that there is as much vitreous body as possible on the frame may be selected at first. At this time, each frame is a tomographic image (B scan image) in the XZ direction. A moving image obtained by aligning other frames in the XZ direction to the selected reference frame may be displayed on the display screen. At this time, for example, it may be configured to continuously display high quality images (high quality frames) sequentially generated by a learned model for image quality enhancement for at least every one frame of the moving image.

Note that, as a method of alignment between frames described above, the same method as the method of alignment in the X direction and the method of alignment in the Z direction (depth direction) may be applied, or a totally different method may be applied. In addition, alignment in one direction may be performed multiple times using different methods. For example, rough alignment and then precise alignment may be performed. In addition, examples of the alignment method include (rough) alignment (in the Z direction) using a retinal layer boundary obtained by applying segmentation processing to a tomographic image (B scan image), (precise) alignment (in the X direction or Z direction) using correlation information (similarity) between multiple regions obtained by dividing the tomographic image and a reference image, alignment (in the X direction) using a one-dimensional projection image generated for each tomographic image (B scan image), and alignment (in the X direction) using a two-dimensional frontal image. In addition, it may be configured that rough alignment is performed in units of pixels and then precise alignment is performed in units of sub-pixels.

Here, in various adjustments, there is a possibility that an imaging target such as the retina of the eye under examination has not been successfully imaged yet. Therefore, because the difference between a medical image input to a learned model and a medical image used as learning data is great, there is a possibility that no high quality image is accurately obtained. Thus, it may be configured that, if the evaluation value of the image quality evaluation of a tomographic image (B scan) exceeds a threshold, displaying of a high quality moving image (continuous displaying of high quality frames) is automatically started. In addition, it may be configured that, if the evaluation value of the image quality evaluation of a tomographic image (B scan) exceeds a threshold, the state is changed to a state where the examiner is able to specify the image quality enhancement button (active state).

In addition, for example, it may be configured that a different learned model for image quality enhancement is prepared for each imaging mode with a different scanning pattern or the like, thereby allowing a learned model for image quality enhancement corresponding to the selected imaging mode to be selected. Alternatively, a single learned model for image quality enhancement may be used, which is obtained by learning learning data including various medical images obtained in different imaging modes.

(Seventh Modification)

In the above-described embodiments and modifications, when various learned models are currently executing additional learning, there is a possibility that it is difficult to perform an output (estimation/prediction) using the learned models currently executing additional learning. Therefore, it is preferable to configure to prohibit an input of a medical image other than learning data for a learned model currently executing additional learning. In addition, the same learned model as the learned model before executing additional learning may be prepared as a spare learned model. At this time, it is preferable to configure to allow execution of an input of a medical image other than learning data for the spare learned model during execution of additional learning. After the additional learning is completed, the learned model having executed the additional learning may be evaluated, and, if there is no problem, the spare learned model may be replaced with the learned model having executed the additional learning. If there is a problem, the spare learned model may be used.

As evaluation of the learned model having executed the additional learning, for example, a learned model for classification for classifying a high quality image obtained by a learned model for image quality enhancement as another type of image may be used. The learned model for classification may be, for example, a learned model obtained by learning learning data including images including a high quality image obtained by a learned model for image quality enhancement and a low quality image as input data, and data where the types of these images are labeled (annotated) as correct answer data. At this time, the type of image of the input data at the time of estimation (prediction) may be displayed together with information (such as a numerical value indicating a proportion) indicating the certainty of each type of image included in the correct answer data at the time of learning. The input data for the learned model for classification may include, besides the above-mentioned images, a high quality image whose contrast has been enhanced or noise has been reduced by superimposing low quality images (for example, by averaging the aligned low quality images). In addition, as evaluation of the learned model having executed the additional learning, for example, high quality images obtained from the same image using the learned model having executed the additional learning and the learned model before executing the additional learning (spare learned model) may be compared, or the results of analyzing these high quality images may be compared. At this time, for example, whether the result of comparing the high quality images (an example of a change caused by the additional learning) or the result of comparing the results of analyzing the high quality images (an example of a change caused by the additional learning) is within a certain range may be determined, and the determination result may be displayed.

In addition, a learned model obtained by learning in units of imaging parts may be selectively used. Specifically, a plurality of learned models including a first learned model obtained using learning data including a first imaging part (such as the anterior segment, posterior segment, or the like), and a second learned model obtained using learning data including a second imaging part different from the first imaging part may be prepared. The control unit 117 may include selecting means for selecting any of these learned models. At this time, the control unit 117 may include control means for executing additional learning of the selected learned model. In response to instructions from the examiner, the control means may search for data where an imaging part corresponding to the selected learned model and a captured image of the imaging part are paired, and execute, as additional learning of the selected learned model, learning using the retrieved data as learning data. Note that the imaging part corresponding to the selected learned model may be obtained from header information of the data, or may be manually input by the examiner. In addition, the data may be searched from, for example, a server in an external facility, such as a hospital or a laboratory, via a network. Accordingly, additional learning may be efficiently performed for each imaging part using a captured image of the imaging part corresponding to the learned model.

Note that the selecting means and the control means may be configured by software modules executed by a processor such as a CPU or an MPU of the control unit 117. In addition, the selecting means and the control means may be configured by circuits that perform specific functions, such as ASICs, or by independent devices.

In addition, in the case of obtaining learning data for additional learning from a server in an external facility, such as a hospital or a laboratory, via a network, it is useful to decrease reduction of reliability due to tampering or system trouble at the time of additional learning. The validity of learning data for additional learning may be detected by checking the consistency using digital signature or hashing. Accordingly, learning data for additional learning may be protected. At this time, it is assumed that, if the validity of learning data for additional learning is not detected as a result of checking the consistency using digital signature or hashing, a warning to that effect is given, and no additional learning is performed using that learning data. Note that the location of the server is not particularly limited, and the server may be of any form, such as a cloud server, fog server, or edge server.

Data protection by checking the consistency as described above is not limited to learning data for additional learning, and is applicable to data including a medical image. In addition, the image management system may be configured so that a distributed network manages exchange of data including medical images between servers in multiple facilities. In addition, the image management system may be configured so that multiple blocks where an exchange log and the hash value of a previous block are recorded together will be connected chronologically. As technology for checking the consistency, cryptography (such as lattice-based cryptography or quantum cryptography using quantum key distribution) that is difficult to calculate even using a quantum computer, such as a quantum gate, may be used. Here, the image management system may include an apparatus and system that receive and save an image captured by an imaging apparatus or a processed image. In addition, the image management system may send an image in response to a request from a connected apparatus, process a saved image, or request another apparatus to perform image processing. The image management system includes, for example, a picture archiving and communication system (PACS). In addition, the image management system includes a database capable of saving various types of information, such as a subject's information related to a received image, and imaging time. In addition, the image management system may be connected to a network, and, in response to a request from another apparatus, send and receive images, convert images, or send and receive various types of information related to saved images.

In the case of performing additional learning of various learned models, processing may be performed at high speed using a GPU. Because a GPU is capable of efficiently performing operation by processing more items of data in parallel, in the case of performing learning multiple times using a learning model as in deep learning, it is effective to perform processing using a GPU. Note that processing of additional learning may be performed by a GPU and a CPU in collaboration.

(Eighth Modification)

In the above-described various embodiments and modifications, instructions from the examiner may be, besides instructions given manually (such as instructions using a user interface or the like), instructions given by speech or the like. At this time, for example, a machine learning model including a speech recognition model (a speech recognition engine, a learned model for speech recognition) obtained by machine learning may be used. In addition, instructions given manually may be instructions given by inputting characters using a keyboard or touchscreen. At this time, for example, a machine learning model including a character recognition model (a character recognition engine, a learned model for character recognition) obtained by machine learning may be used. In addition, instructions from the examiner may be instructions given by gestures or the like. At this time, a machine learning model including a gesture recognition model (a gesture recognition engine, a learned model for gesture recognition) obtained by machine learning may be used.

In addition, instructions from the examiner may be the result of detecting the examiner's line of sight on the display screen of the display unit 116. The line-of-sight detection result may be, for example, a pupil detection result using the examiner's moving image obtained by capturing an image from around the display screen of the display unit 116. At this time, pupil detection from the moving image may use an object recognition engine as described above. In addition, instructions from the examiner may be instructions given by brain waves, weak electric signals flowing through the body, or the like.

In such a case, for example, learning data may be learning data including character data or speech data (waveform data) indicating instructions to display the results obtained by processing of various learned models as described above as input data, and an execution command for actually displaying the results obtained by processing of the various learned models on the display unit 116 as correct answer data. In addition, learning data may be, for example, learning data including an execution command as to whether to perform auto-setting of imaging parameters, and an execution command for changing a button for the command to an active state as correct answer data. Note that learning data may be any data as long as, for example, the contents of instructions indicated by character data, speech data, or the like and the contents of an execution command correspond to each other. In addition, speech data may be converted to character data using an acoustic model and a language model. In addition, processing to reduce noise data superimposed on speech data may be performed using waveform data obtained by microphones. In addition, it may be configured that instructions given using characters or speech, and instructions given using a mouse or touchscreen are selectable according to instructions from the examiner. In addition, it may be configured that on/off of instructions given using characters, speech, or the like is selectable according to instructions from the examiner.

Here, machine learning includes deep learning as mentioned above, and, for example, a recurrent neural network (RNN) may be used for at least some of neural networks of multiple layers. Here, as an example of a machine learning model according to the present modification, RNN, which is a neural network that handles chronological information, will be described with reference to FIGS. 10A and 10B. In addition, long short-term memory (hereinafter referred to as LSTM), which is one type of RNN, will be described with reference to FIGS. 11A and 11B.

Figure 10A:
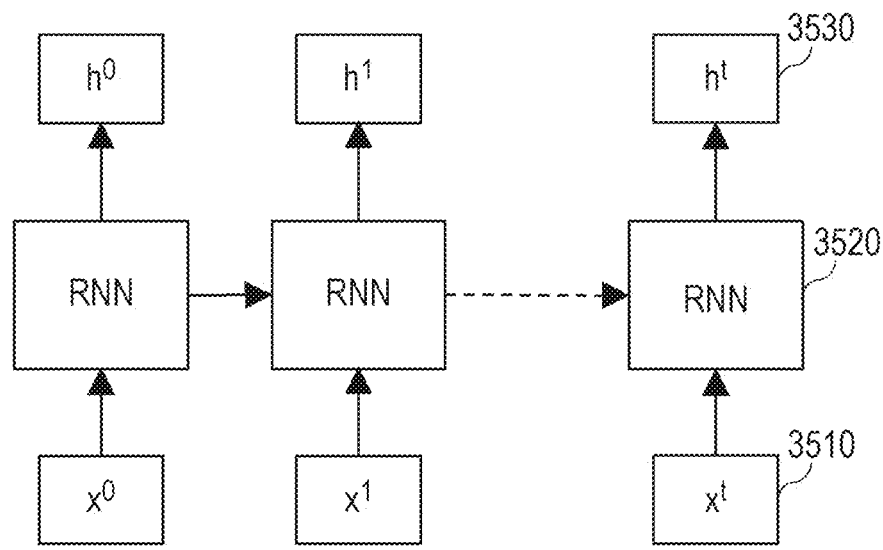
FIG. 10A is a diagram illustrating an example of the configuration of neural networks used as a machine learning model according to an eighth modification.
Figure 10B:
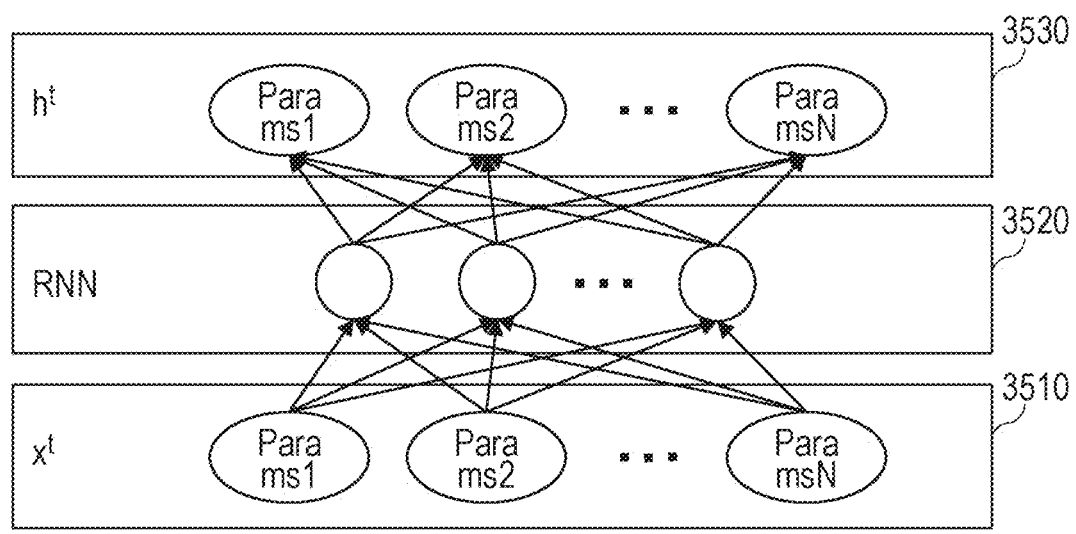
FIG. 10B is a diagram illustrating an example of the configuration of a neural network used as the machine learning model according to the eighth modification.

FIG. 10A illustrates the structure of RNN serving as a machine learning model. RNN 3520 has a network with a loop structure, and receives data xt 3510 and output data ht 3530 at time t. Since the RNN 3520 has a network with a loop structure, the RNN 3520 is capable of handing the state at the current time to the next state, and accordingly, the RNN 3520 is capable of handling chronological information. FIG. 10B illustrate an example of an input/output of parameter vectors at time t. Data xt 3510 includes N items (Params1 to ParamsN) of data. In addition, data ht 3530 output from the RNN 3520 includes N items (Params1 to ParamsN) of data corresponding to input data.

Figure 11A:
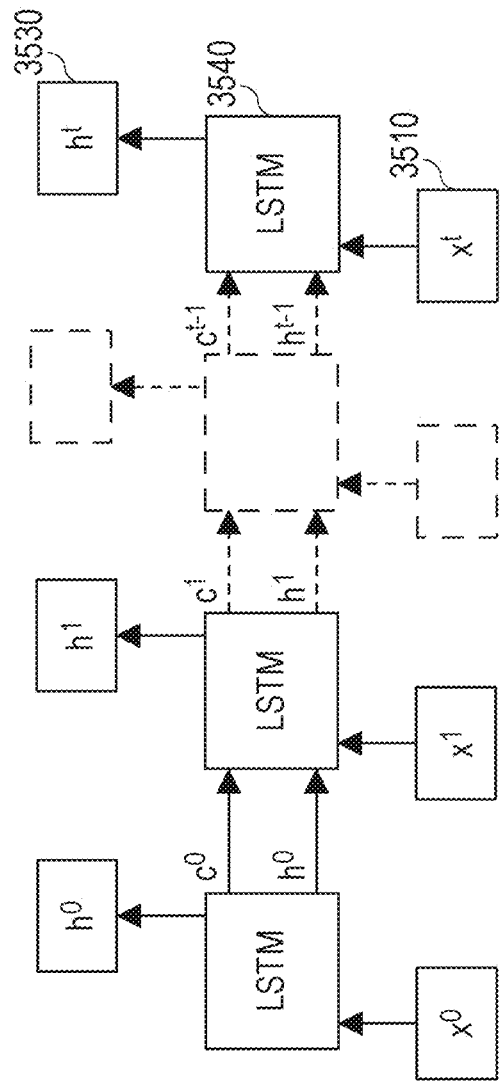
FIG. 11A is a diagram illustrating an example of the configuration of neural networks used as a machine learning model according to the eighth modification.

However, because RNN is incapable of handling long-term information at the time of backpropagation, LSTM may be used. Because LSTM includes a forget gate, an input gate, and an output gate, LSTM is capable of learning long-term information. Here, FIG. 11A illustrates the structure of LSTM. In LSTM 3540, information handed by a network to the next time t includes an internal state ct-1 of a network called a cell, and output data ht-1. Note that the subscripts (c, h, and x) in the drawings represent vectors.

Figure 11B:
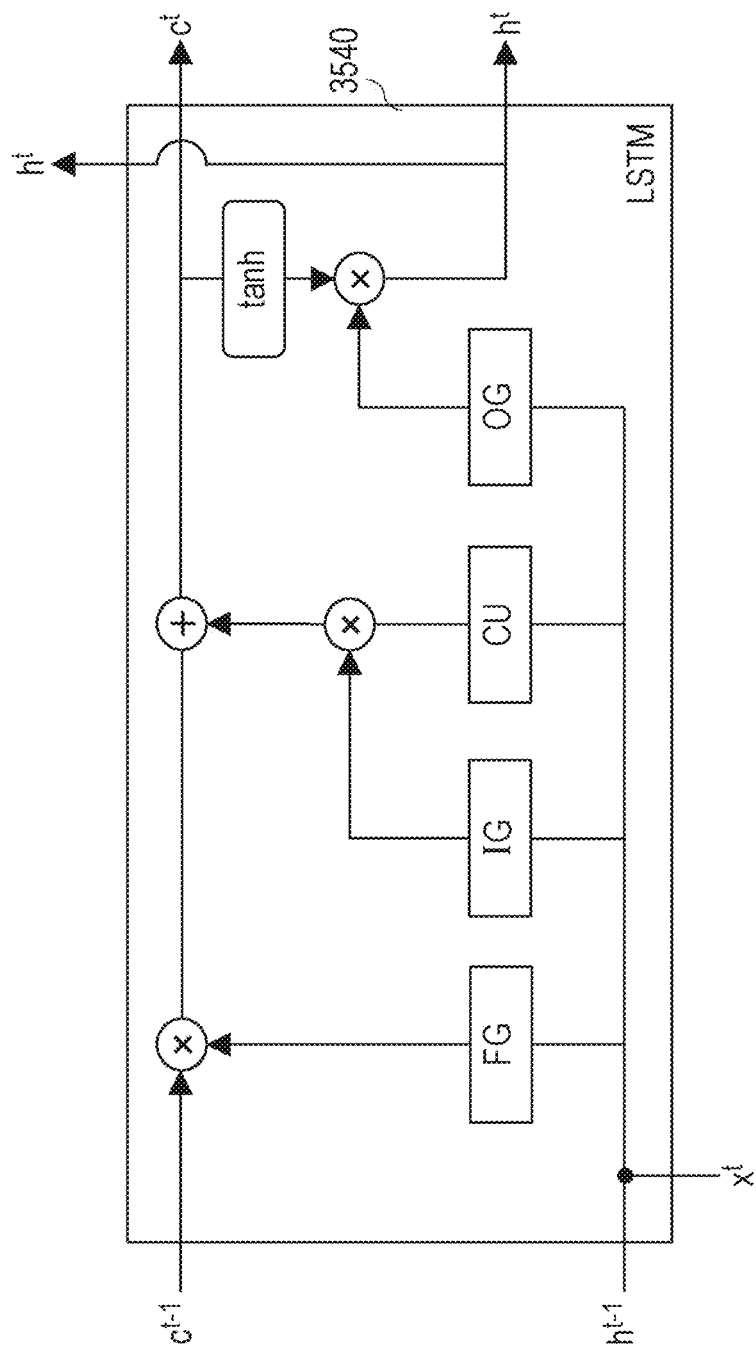
FIG. 11B is a diagram illustrating an example of the configuration of a neural network used as the machine learning model according to the eighth modification.

Next, FIG. 11B illustrates the details of the LSTM 3540. In FIG. 11B, FG indicates a forget gate network, IG indicates an input gate network, and OG indicates an output gate network, each of which is a sigmoid layer. Therefore, each element outputs a vector with a value from 0 to 1. The forget gate network FG is for determining how much past information is retained, and the input gate network IG is for determining which value to update. CU is a cell update candidate network, and is an activation function tank layer. This generates a vector of a new candidate value added to a cell. The output gate network OG selects a cell candidate element and selects how much information to convey at the next time.

Since the above-described LSTM model is a basic form, LSTM is not limited to the networks illustrated here. The coupling between networks may be changed. Instead of LSTM, QRNN (Quasi Recurrent Neural Network) may be used. Furthermore, a machine learning model is not limited to neural networks, and boosting and support vector machines may be used. In addition, in the case where instructions from the examiner are input by characters or speech, technology regarding natural language processing (such as Sequence to Sequence) may be applied. At this time, as technology regarding natural language processing, for example, a model that performs an output for each input sentence may be applied. In addition, the above-mentioned various learned models are applicable not only to instructions from the examiner, but also to an output for the examiner. In addition, a dialogue engine (a dialogue model, a learned model for dialogue) that responds to the examiner with an output of characters or speech may be applied.

In addition, as technology regarding natural language processing, a learned model obtained by pre-learning document data by unsupervised learning may be used. In addition, as technology regarding natural language processing, a learned model obtained by further transfer-learning (or fine-tuning), according to the purpose, the learned model obtained by pre-learning may be used. In addition, as technology regarding natural language processing, for example, BERT (Bidirectional Encoder Representations from Transformers) may be applied. In addition, as technology regarding natural language processing, a model capable of extracting (representing) a context (feature) by itself by predicting a specific word in a sentence from both the left and right contexts may be applied. In addition, as technology regarding natural language processing, a model capable of determining the relationship (continuity) of two sequences (sentences) in input chronological data may be applied. In addition, as technology regarding natural language processing, a model where an encoder of a transformer is used in a hidden layer, and a vector sequence is input and output may be applied.

Here, instructions from the examiner to which the present modification is applicable may be anything as long as they are for at least one of the following: changing the display of various images and analysis results described in the above-described various embodiments and modifications; selecting the depth range for generating an En-Face image; selecting whether to use an image as learning data for additional learning; selecting a learned model; or outputting (displaying or sending) or saving the results obtained using various learned models. In addition, instructions from the examiner to which the present modification is applicable may be not only instructions given after imaging, but also instructions given before imaging. For example, these instructions may be instructions regarding various adjustments, instructions regarding the settings of various imaging conditions, and instructions regarding the start of imaging. In addition, instructions from the examiner to which the present modification is applicable may be instructions for changing the display screen (screen transition).

Note that the machine learning model may be a machine learning model combining a machine learning model regarding an image such as CNN and a machine learning model regarding chronological data such as RNN. In such a machine learning model, for example, the relationship between features regarding images and features regarding chronological data may be learned. In the case where the input layer side of the machine learning model is CNN and the output layer side is RNN, for example, learning may be performed using learning data including a medical image as input data and text regarding the medical image (such as whether there is a lesion, the type of lesion, or the recommended next examination) as output data. Accordingly, for example, because medical information regarding a medical image is automatically explained in text, even an examiner who is less experienced in the medical field may easily grasp the medical information regarding the medical image. In addition, in the case where the input layer side of the machine learning model is RNN and the output layer side is CNN, for example, learning may be performed using learning data including text regarding medical treatment such as a lesion, findings, or diagnosis as input data, and a medical image corresponding to the text regarding medical treatment as output data. Accordingly, for example, a medical image related to a disease that the examiner needs to check may be easily retrieved.

In addition, for instructions from the examiner or an output for the examiner, a machine translation engine (a machine translation model, a learned model for machine translation) that machine-translates text in characters or speech to an arbitrary language may be used. Note that it may be configured that the arbitrary language is selectable according to instructions from the examiner. In addition, it may be configured that the arbitrary language is automatically selectable by using a learned model that automatically recognizes the type of language. In addition, it may be configured that the auto-selected type of language is modifiable according to instructions from the examiner. For example, the above-described technology regarding natural language processing (such as Sequence to Sequence) may be applied to the machine translation engine. For example, it may be configured that, after text input to the machine translation engine is machine-translated, the machine-translated text is input to a character recognition engine or the like. In addition, for example, it may be configured that text output from the above-mentioned various learned models is input to the machine translation engine, and text output from the machine translation engine is output.

In addition, the above-mentioned various learned models may be used in combination. For example, it may be configured that characters corresponding to instructions from the examiner are input to a character recognition engine, and speech obtained from the input characters is input to another type of machine learning engine (such as a machine translation engine). In addition, for example, it may be configured that characters output from another type of machine learning engine are input to a character recognition engine, and speech obtained from the input characters is output. In addition, for example, it may be configured that speech corresponding to instructions from the examiner is input to a speech recognition engine, and characters obtained from the input speech are input to another type of machine learning engine (such as a machine translation engine). In addition, for example, it may be configured that speech output from another type of machine learning engine is input to a speech recognition engine, and characters obtained from the input speech are displayed on the display unit 116. At this time, for example, it may be configured that, as an output for the examiner, an output of characters or an output of speech is selectable according to instructions from the examiner. In addition, it may be configured that, as instructions from the examiner, an input of characters or an input of speech is selectable according to instructions from the examiner. In addition, the above-described various configurations may be adopted in response to selection by instructions from the examiner.

(Ninth Modification)

A label image, a high quality image, or the like regarding an image obtained by this imaging may be saved in the storage unit 114 in response to instructions from the operator. At this time, for example, after instructions are given from the operator for saving a high quality image, at the time of registration of a file name, a file name including information (such as characters) indicating that the file is an image generated by processing (image quality enhancement processing) using a learned model for image quality enhancement in any part (such as the first part or the last part) of the file name may be displayed as a recommended file name in an editable state in response to instructions from the operator. Similarly, for a label image or the like, a file name including information indicating that the file is an image generated by processing using a learned model may be displayed.

In addition, on various display screens such as a report screen, in the case of displaying a high quality image on the display unit 116, display indicating that the displayed image is a high quality image generated by processing using an image quality enhancement model may be displayed along with the high quality image. In this case, because the operator may easily identify from the display that the high quality image being displayed is not the image obtained by imaging, wrong diagnosis may be reduced, or the efficiency of diagnosis may be improved. Note that display indicating that the image is a high quality image generated by processing using an image quality enhancement model may be of any form as long as an input image and a high quality image generated by the processing are distinguishable. In addition, not only for processing using an image quality enhancement model, but also for processing using various learned models as described above, display indicating that the result is one generated by processing using that particular type of learned model may be displayed along with the result. For example, in the case of displaying the analysis result of a segmentation result using a learned model for image segmentation processing, display indicating that the result is an analysis result based on the result using the learned model for image segmentation may be displayed along with the analysis result.

At this time, the display screen such as a report screen may be saved as image data in the storage unit 114 in response to instructions from the operator. For example, a report screen may be saved in the storage unit 114 as a single image where a high quality image and so forth and display indicating that these images are images generated by processing using learned models are arranged side by side.

In addition, for display indicating that the image is a high quality image generated by processing using an image quality enhancement model, display indicating what kind of learning data was used to train the image quality enhancement model may be displayed on the display unit 116. The display may include a description of the type of input data and correct answer data of learning data, and arbitrary display regarding correct answer data, such as the imaging part included in the input data and the correct answer data. Note that, for example, also for processing using the above-described various learned models such as image segmentation processing, display indicating what kind of learning data was used to train that particular type of learned model may be displayed on the display unit 116.

In addition, it may be configured that information (such as characters) indicating that the image is an image generated by processing using a learned model is displayed or saved superimposed on the image. At this time, the position to superimpose the information on the image may be in any region (such as the edge of the image) as long as the region does not overlap with a region where the part of interest serving as the imaging target is displayed. In addition, a non-overlapping region may be determined, and the information may be superimposed on the determined region. Images obtained not only by processing using an image quality enhancement model, but also by processing using the above-mentioned various learned models, such as image segmentation processing, may be processed in the same or similar manner.

In addition, it may be configured that, if, as an initial display screen of a report screen, the image quality enhancement processing button or the like is set to active (image quality enhancement processing is on) by default, a report image corresponding to a report screen including a high quality image and the like is sent to a server. In addition, it may be configured that, if the button is set to active by default, at the end of an examination (such as in the case where an imaging checking screen or a preview screen is changed to a report screen in response to instructions from the examiner), a report image corresponding to a report screen including a high quality image and the like is (automatically) sent to a server. At this time, it may be configured that a report image generated on the basis of various settings of the default settings (settings for at least one of, for example, the depth range for generating an En-Face image on the initial display screen of the report screen, whether to superimpose an analysis map, whether the image is a high quality image, or whether the display screen is a follow-up display screen) is sent to a server. Note that the case where the button represents switching of segmentation processing may be processed in the same or similar manner.

(Tenth Modification)

In the above-described embodiments and modifications, among various learned models as described above, an image (such as a high quality image, an image indicating an analysis result such as an analysis map, an image indicating a certain region detection result, or an image indicating a segmentation result) obtained by a learned model of a first type may be input to a learned model of a second type different from the first type. At this time, it may be configured that a result (such as an estimation result, analysis result, diagnostic result, certain region detection result, or segmentation result) is generated by processing of the learned model of the second type.

In addition, among various learned models as described above, using a result (such as an estimation result, analysis result, diagnostic result, certain region detection result, or segmentation result) obtained by processing of a learned model of a first type, an image to be input to a learned model of a second type different from the first type may be generated from an image input to the learned model of the first type. At this time, the generated image is highly likely to be an image suitable as an image to be processed using the learned model of the second type. Therefore, the accuracy of an image (such as a high quality image, an image indicating an analysis result such as an analysis map, an image indicating a certain region detection result, or an image indicating a segmentation result) obtained by inputting the generated image to the learned model of the second type may be improved.

Note that it may be configured that, by inputting a common image to a learned model of a first type and a learned model of a second type, generation (or display) of processing results using these learned models is executed. At this time, for example, it may be configured that generation (or display) of processing results using these learned models is collectively (collaboratively) executed in response to instructions from the examiner. In addition, it may be configured that the type of to-be-input image (such as a high quality image, object recognition result, segmentation result, or similar case image), the type of to-be-generated (or displayed) processing result (such as a high quality image, estimation result, diagnostic result, analysis result, object recognition result, segmentation result, or similar case image), or the type of input or the type of output (such as characters, speech, or language) is selectable according to instructions from the examiner. In addition, it may be configured that the type of input is automatically selectable by using a learned model that automatically recognizes the type of input. In addition, it may be configured that the type of output is automatically selectable so as to correspond to the type of input (such as to be of the same type). In addition, it may be configured that the auto-selected type is modifiable according to instructions from the examiner. At this time, it may be configured that at least one learned model is selected in accordance with the selected type. At this time, if multiple learned models are selected, how these learned models are combined (such as the order of inputting data) may be determined in accordance with the selected types. Note that, for example, it may be configured that the type of to-be-input image and the type of to-be-generated (or displayed) processing result are selectable to be different, or, if the types are the same, it may be configured that information for prompting the examiner to select the types to be different is output to the examiner. Note that each learned model may be executed at any place. For example, it may be configured that, among multiple learned models, some are used on a cloud server, and others are used on another server such as a fog server or an edge server. In the case where a network in a facility, in a site including a facility, or in an area including multiple facilities is configured to be capable of wireless communication, the reliability of the network may be improved by, for example, configuring the network to use radio waves in a dedicated wavelength band exclusively assigned to the facility, site, or area. In addition, the network may be configured by wireless communication that allows high-speed, large-capacity, and low-delay communication as well as numerous simultaneous connections. In doing so, for example, surgeries of the vitreous body, cataract, glaucoma, corneal refraction correction, external eye, and the like, and treatment such as laser photocoagulation may be supported in real time even from a remote place. At this time, for example, it may be configured that information obtained by, using at least one of various learned models, a fog server, edge server, or the like that has wirelessly received at least one of various medical images obtained by an apparatus regarding such surgeries and treatment is sent wirelessly to the apparatus regarding the surgeries and treatment. In addition, for example, information received wirelessly at the apparatus regarding the surgeries and treatment may be a movement amount (vector) of the above-mentioned optical system or optical member, and, in this case, the apparatus regarding the surgeries and treatment may be configured to be automatically controlled. In addition, for example, to support an operation performed by the examiner, it may be configured as auto-control (semi-auto control) that involves a permission from the examiner.

In addition, a similar case image search using an external database stored in a server or the like may be conducted using, as a search key, the analysis result or diagnostic result obtained by processing of a learned model as described above. In addition, a similar case image search using an external database stored in a server or the like may be conducted using, as a search key, the object recognition result or segmentation result obtained by processing of various learned models as described above. If medical images saved in the database are managed while their features are already attached as supplementary information by machine learning or the like, a similar case image search engine (a similar case image search model, a learned model for similar case image search) that uses a medical image itself as a search key may be used. For example, using a learned model for similar case image search (which is different from a learned model for image quality enhancement), the control unit 117 may search for a similar case image related to the foregoing medical image from various medical images. In addition, for example, the display control unit 121 may display, on the display unit 116, a similar case image obtained from various medical images by using the learned model for similar case image search. At this time, the similar case image is, for example, an image with a feature similar to the feature of a medical image input to the learned model. In addition, for example, if a medical image input to the learned model includes a partial region such as an abnormal part, the similar case image is an image with a feature similar to the feature of the partial region such as the abnormal part. Therefore, for example, in addition to the fact that learning for accurately searching for a similar case image is efficiently performed, if a medical image includes an abnormal part, the examiner may efficiently diagnose the abnormal part. In addition, multiple similar case images may be retrieved, and the similar case images may be displayed in such a manner that the order in which their features are similar is identifiable. In addition, the learned model for similar case image search may be configured to perform additional learning using learning data including an image selected from among similar case images according to instructions from the examiner and the feature of the image.

In addition, learning data of various learned models is not limited to data obtained using ophthalmic equipment that actually captures images, and may be, according to a desired configuration, data obtained using ophthalmic equipment of the same model or data obtained using ophthalmic equipment of the same type.

Note that various learned models according to the above-described embodiments and modifications may be provided in the control unit 117. The learned models may be configured by, for example, software modules executed by a processor such as a CPU, MPU, GPU, or FPGA, or a circuit that performs specific functions, such as an ASIC. Alternatively, these learned models may be provided in another server apparatus connected to the control unit 117. In this case, the control unit 117 may use the learned models by connecting to the server or the like including the learned models via an arbitrary network such as the Internet. Here, the server including the learned models may be, for example, a cloud server, fog server, or edge server. In the case where a network in a facility, in a site including a facility, or in an area including multiple facilities is configured to be capable of wireless communication, the reliability of the network may be improved by, for example, configuring the network to use radio waves in a dedicated wavelength band exclusively assigned to the facility, site, or area. In addition, the network may be configured by wireless communication that allows high-speed, large-capacity, and low-delay communication as well as numerous simultaneous connections.

(Eleventh Modification)

Medical images processed by the control unit 117 according to the above-described various embodiments and modifications include images obtained using an arbitrary modality (imaging apparatus, imaging method). To-be-processed medical images may include medical images obtained by an arbitrary imaging apparatus or the like, and images created using a medical image processing apparatus or a medical image processing method.

Furthermore, to-be-processed medical images are images of a certain part of a subject (object under examination), and images of the certain part include at least part of the certain part of the subject. In addition, the medical images may include other parts of the subject. In addition, the medical images may be still images or moving images, and may be monochrome images or color images. Furthermore, the medical images may be images representing the structure (form) of the certain part, or images representing functions thereof. Images representing functions include images representing blood flow dynamics (blood flow rate, blood flow velocity, etc.), such as OCTA images, doppler OCT images, fMRI images, and ultrasonic doppler images. Note that the certain part of the subject may be determined according to the imaging target, and includes organs such as human eyes (eyes under examination), brain, lungs, intestine, heart, pancreas, kidneys, and livers, and arbitrary parts such as head, chest, legs, and arms. Particularly in the above-described various embodiments and modifications, medical images of the eye under examination are used for estimation processing. Regarding this, an object under examination regarding medical images used for estimation processing in the above-described various embodiments and modifications is not limited to an eye under examination, and may be any object under examination that is symmetrical in the horizontal direction, vertical direction, or horizontal and vertical directions, e.g., other organs including lungs, etc. Note that an object under examination regarding the above-described various embodiments and modifications is not limited to an object under examination that is symmetrical. In the case where an object under examination is an organ such as a lung, the imaging apparatus may have a configuration such as an endoscope.

In addition, medical images may be the subject's tomographic images or frontal images. Frontal images include, for example, an SLO image of the fundus or anterior segment, a photofluorographic fundus image, and an En-Face image generated using data that covers at least part of, in the depth direction of the imaging target, data obtained by OCT (three-dimensional OCT data). An En-Face image may be an En-Face image (motion contrast frontal image) of OCTA generated using data that covers at least part of, in the depth direction of the imaging target, three-dimensional OCTA data (three-dimensional motion contrast data). In addition, three-dimensional OCT data and three-dimensional motion contrast data are examples of three-dimensional medical image data.

Here, motion contrast data is data indicating a change between items of volume data obtained by applying control to scan the same region (same position) of an eye under examination multiple times with observation light. At this time, volume data includes multiple tomographic images obtained at different positions. Since data indicating a change between tomographic images obtained at substantially the same positions is obtained at each of these different positions, motion contrast data may be obtained as volume data. Note that a motion contrast frontal image is also referred to as an OCT frontal image (En-Face image of OCTA) regarding OCT angiography (OCTA) measuring blood flow movement, and motion contrast data is also referred to as OCTA data. Motion contrast data may be obtained as, for example, a decorrelation value, variance value, or maximum divided by minimum (maximum/minimum) between two tomographic images or interference signals corresponding to the two tomographic images, and may be obtained by an arbitrary method of the related art. At this time, the two tomographic images may be obtained by applying control to scan the same region (same position) of an eye under examination multiple times with observation light. In the case of controlling scanning means to scan substantially the same positions multiple times with observation light, it may be configured that a time interval between one scan (one B scan) and the next scan (the next B scan) is changed (determined). Accordingly, for example, even in the case of different blood flow velocities depending on the condition of blood vessels, vascular regions may be accurately visualized. At this time, for example, it may be configured that the above-mentioned time interval is changeable according to instructions from the examiner. Also, for example, it may be configured that any of motion contrast images corresponding to multiple preset time intervals is selectable according to instructions from the examiner. In addition, for example, it may be configured that a time interval at which motion contrast data is obtained and the motion contrast data may be stored in association with each other in the storage unit 114. In addition, for example, the display control unit 121 may display, on the display unit 116, a time interval at which motion contrast data is obtained and a motion contrast image corresponding to the motion contrast data. In addition, for example, it may be configured that the above-mentioned time interval is automatically determined, or at least one candidate for the above-mentioned time interval is determined. At this time, for example, it may be configured that the above-mentioned time interval is determined (output) from a motion contrast image using a machine learning model. Such a machine learning model may be obtained by, for example, learning learning data including multiple motion contrast images corresponding to multiple time intervals as input data, and differences between the multiple time intervals to a time interval at which a desired motion contrast image is obtained as correct answer data.

In addition, an En-Face image is, for example, a frontal image generated by projecting data that is in the range between two layer boundaries in the XY direction. At this time, a frontal image is generated by projecting or integrating data corresponding to a depth range that is at least part of volume data (three-dimensional tomographic images) obtained using optical interference and that is determined on the basis of two reference planes. An En-Face image is a frontal image generated by projecting, of the volume data, data corresponding to a depth range determined on the basis of a detected retinal layer to a two-dimensional plane. As a method of projecting data corresponding to a depth range determined on the basis of two reference planes to a two-dimensional plane, for example, a method of using the representative value of data within the depth range as a pixel value on the two-dimensional plane may be used. Here, the representative value may include the mean, median, or maximum of pixel values within a range in the depth direction of a region surrounded by the two reference planes. In addition, the depth range regarding the En-Face image may be, for example, a range that includes a certain number of pixels in a deeper or shallower direction relative to one of the two layer boundaries regarding the detected retinal layer. In addition, the depth range regarding the En-Face image may be, for example, a range changed (offset) from the range between the two layer boundaries regarding the detected retinal layer in response to instructions from the operator.

In addition, the imaging apparatus is an apparatus for capturing an image used for diagnosis. The imaging apparatus includes, for example, an apparatus that captures an image of a certain part of a subject by irradiating the certain part with radiation such as light, X-rays, and electromagnetic waves, or ultrasonic waves, and an apparatus that captures an image of the certain part by detecting radiation emitted from a photographic subject. More specifically, the imaging apparatus according to the above-described various embodiments and modifications at least includes an X-ray imaging machine, CT scanner, MRI scanner, PET scanner, SPECT scanner, SLO scanner, OCT scanner, OCTA scanner, fundus camera, and endoscope. Note that the configuration according to the above-described embodiments and modifications is applicable to these imaging apparatuses. In this case, movement of an object under examination corresponding to the to-be-predicted movement of an eye under examination described above includes, for example, movement of the face or body, movement of the heart (heartbeat), or the like.

Note that the OCT scanner may include a time-domain OCT (TD-OCT) scanner or Fourier domain OCT (FD-OCT) scanner. In addition, the Fourier domain OCT scanner may include a spectral domain OCT (SD-OCT) scanner and a wavelength-sweep OCT (SS-OCT) scanner. In addition, the OCT scanner may include a Line-OCT scanner using line light (or an SS-Line-OCT scanner). In addition, the OCT scanner may include a Full Field-OCT scanner using area light (or an SS-Full Field-OCT scanner). In addition, the OCT scanner may include a doppler-OCT scanner. In addition, the SLO scanner and the OCT scanner may include a wavefront compensation SLO (AO-SLO) scanner and a wavefront compensation OCT (AO-OCT) scanner using a wavefront compensation optical system. In addition, the SLO scanner and the OCT scanner may include a polarization sensitive SLO (PS-SLO) scanner and a polarization sensitive OCT (PS-OCT) scanner for visualizing information regarding a polarization phase difference or depolarization. In addition, the SLO scanner and the OCT scanner may include a pathologic microscope SLO scanner and a pathologic microscope OCT scanner. In addition, the SLO scanner and the OCT scanner may include a handheld SLO scanner and a handheld OCT scanner. In addition, the SLO scanner and the OCT scanner may include a catheter SLO scanner and a catheter OCT scanner. In addition, the SLO scanner and the OCT scanner may include a head-mounted SLO scanner and a head-mounted OCT scanner. In addition, the SLO scanner and the OCT scanner may include a binocular SLO scanner and a binocular OCT scanner. In addition, the SLO scanner and the OCT scanner may change the imaging angle of view using an optical magnification configuration. In addition, the SLO scanner may be capable of capturing a color image or a photofluorographic image using a configuration where, using R, G, and B light sources, one light-receiving element receives light in time division, or multiple light-receiving elements simultaneously receive light.

In addition, in the above-described embodiments and modifications, the control unit 117 may be configured as part of the OCT scanner, or may be configured separately from the OCT scanner. In this case, the control unit 117 may be connected to an imaging apparatus such as the OCT scanner via the Internet or the like. In addition, the configuration of the OCT scanner is not limited to the above configuration, and some of configurations, such as an SLO imaging unit, included in the OCT scanner may be configurations separate from the OCT scanner.

Because learned models for speech recognition, character recognition, and gesture recognition according to the above-mentioned modifications perform learning using chronological data, it is considered that the gradient between input consecutive and chronological data values is extracted as part of a feature and is used for estimation processing. Such learned models are expected to perform accurate estimation by using the influence of a temporal change in a specific numerical value for the estimation processing. In addition, in learned models for estimation processing, image quality enhancement, segmentation processing, image analysis, and diagnostic result generation according to the above-mentioned embodiments and modifications, it is considered that the magnitude of luminance values of tomographic images, the order, gradient, position, distribution, and continuity of a bright portion and a dark portion, or the like is extracted as part of a feature and is used for estimation processing.

OTHER EMBODIMENTS

In addition, technology disclosed in the present specification may be implemented as, for example, a system, apparatus, method, program, or recording medium (storage medium). Specifically, the technology is applicable to a system including a plurality of items of equipment (such as a host computer, interface equipment, an imaging apparatus, and a web application), or to an apparatus including a single item of equipment.

It should also be understood that an object of technology disclosed in the present specification is achieved as follows. That is, a recording medium (or storage medium) having recorded thereon program code (computer program) of software realizing functions of the above-mentioned embodiments is supplied to a system or apparatus. Needless to say, the storage medium is a computer-readable storage medium. A computer (or CPU or MPU) of the system or apparatus reads and executes the program code stored in the recording medium. In this case, the program code itself, which is read from the recording medium, realizes the functions of the above-mentioned embodiments, and the recording medium having recorded thereon the program code forms technology disclosed in the present specification.

In addition, technology disclosed in the present specification may also be realized by a process of supplying a program realizing one or more functions of the above-mentioned embodiments and modifications to a system or apparatus via a network or storage medium, and reading and executing the program by a computer of the system or apparatus. The computer includes one or more processors or circuits, and, in order to read and execute computer-executable commands, the computer may include a network of separate multiple computers or of separate multiple processors or circuits.

The processors or circuits may include a central processing unit (CPU), micro-processing unit (MPU), graphics processing unit (GPU), application specific integrated circuit (ASIC), or field-programmable gateway (FPGA). In addition, the processors or circuits may include a digital signal processor (DSP), data flow processor (DFP), or neural processing unit (NPU).

According to the disclosure of the present specification, the determination accuracy of disease risk determination may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
obtaining means for obtaining a subject's medical image;
estimation means for estimating the subject's risk of developing a disease (a) by inputting, as input data, a feature obtained from the obtained medical image to a learned model that has learned a relationship between a feature obtained from a medical image and a risk of developing the disease or (b) by inputting, as input data, the obtained-fundus medical image to a learned model that has deep-learned a relationship between a medical image and a risk of developing the disease; and
correction means for correcting the estimated risk of developing the disease using a weight coefficient of the probability of developing each disease, the weight coefficient being set in advance for each item of the subject's biological information.

2. The information processing apparatus according to claim 1, wherein the estimation means estimates the subject's risk of developing a first disease and a second disease using a learned model that has learned a relationship between a feature obtained from the medical image and a risk of developing the first disease, which is evaluated from the feature, and a relationship between a feature obtained from the medical image and a risk of developing the second disease, which is evaluated from the feature.

3. The information processing apparatus according to claim 1, wherein the estimation means estimates the subject's risk of developing a first disease and a second disease using a first learned model that has learned a relationship between a feature obtained from the medical image and a risk of developing the first disease, which is evaluated from the feature, and a second learned model that has learned a relationship between a feature obtained from the medical image and a risk of developing the second disease, which is evaluated from the feature.

4. The information processing apparatus according to claim 1, wherein the estimation means estimates a probability as the subject's risk of developing the disease by inputting a feature obtained from the subject's medical image to the learned model.

5. The information processing apparatus according to claim 1, wherein:
the learned model learns a relationship between vascular morphology obtained from the medical image and a risk of developing cardiovascular disease, which is evaluated from the vascular morphology,
the correction means performs correction using at least one type of biological information among the subject's blood pressure, body-mass index (BMI), age, sex, medical history, or smoking habit, and
the vascular morphology includes at least one of features indicating an artery diameter, vein diameter, ratio of the artery diameter and the vein diameter, vascular bifurcation angle, asymmetry of the bifurcation, arterial vein stenosis, or vascular twisting.

6. The information processing apparatus according to claim 1, further comprising display control means for displaying the corrected risk of developing the disease on a display unit,
 wherein the display control means displays, on the display unit, at least one of (a) the corrected risk of developing the disease, which is classified in one of a plurality of classes, (b) the corrected risk of developing the disease in parallel with the subject's medical image, (c) a graph based on a probability corresponding to the corrected risk of developing the disease, or (d) the subject's medical image, a part of which highly correlated with the disease being emphasized.

7. The information processing apparatus according to claim 1, further comprising display control means for displaying the corrected risk of developing the disease on a display unit,
 wherein the display control means displays a recommended medical institution in accordance with the corrected risk of developing the disease and a type of the disease on the display unit.

8. The information processing apparatus according to claim 7, wherein, in response to completion of an appointment with the recommended medical institution, the medical image used for estimating the risk of developing the disease, the biological information used for correcting the estimated risk of developing the disease, and the estimated risk of developing the disease are sent to the recommended medical institution via a system of the recommended medical institution.

9. The information processing apparatus according to claim 7, wherein diagnosis or consultation by a physician at the recommended medical institution is provided in accordance with the corrected risk of developing the disease and the type of the disease via a system capable of performing video communication.

10. An information processing apparatus comprising:
 estimation means for estimating a subject's risk of developing a disease using a learned model that has learned a relationship of a feature obtained from a medical image and biological information obtained by an examination apparatus with a risk of developing the disease;
 correction means for correcting the estimated risk of developing the disease using a weight coefficient of the probability of developing each disease, the weight coefficient being set in advance for each item of the subject's biological information; and
 display control means for displaying the estimated risk of developing the disease on a display unit.

11. An information processing system comprising:
 ophthalmic equipment that captures a medical image of a subject;
 an examination apparatus that examines the subject and obtains biological information; and
 an information processing apparatus according to claim 1.

12. An information processing method comprising:
 obtaining a medical image captured by imaging a subject's medical;
 estimating the subject's risk of developing a disease (a) by inputting, as input data, a feature obtained from the obtained medical image to a learned model that has learned a relationship between a feature obtained from a medical image and a risk of developing the disease or (b) by inputting, as input data, the obtained medical image to a learned model that has deep-learned a relationship between a medical image and a risk of developing the disease; and
 correcting the estimated risk of developing the disease using a weight coefficient of the probability of developing each disease, the weight coefficient being set in advance for each item of the subject's biological information.

13. An information processing method comprising:
 estimating a subject's risk of developing a disease using a learned model that has learned a relationship of a feature obtained from a medical image and biological information obtained by an examination apparatus with a risk of developing the disease;
 correction means for correcting the estimated risk of developing the disease using a weight coefficient of the probability of developing each disease, the weight coefficient being set in advance for each item of the subject's biological information; and
 displaying the estimated risk of developing the disease on a display unit.

14. A non transitory computer-readable storage medium storing a program for causing a computer to execute the method according to claim 12.

15. A non transitory computer-readable storage medium storing a program for causing a computer to execute the method according to claim 13.

* * * * *